United States Patent
Laroia

(10) Patent No.: US 12,361,580 B1
(45) Date of Patent: Jul. 15, 2025

(54) CAMERA ARRAY AND METHODS OF USING CAPTURED IMAGES FROM A CAMERA ARRAY FOR DEPTH DETERMINATION PURPOSES

(71) Applicant: More, Inc., San Mateo, CA (US)

(72) Inventor: Rajiv Laroia, Far Hills, NJ (US)

(73) Assignee: More, Inc., San Mateo, CA (US)

( * ) Notice: Subject to any disclaimer, the term of this patent is extended or adjusted under 35 U.S.C. 154(b) by 0 days.

(21) Appl. No.: 18/668,129

(22) Filed: May 17, 2024

(51) Int. Cl.
| | |
|---|---|
| *H04N 13/271* | (2018.01) |
| *G06T 7/593* | (2017.01) |
| *H04N 13/243* | (2018.01) |
| *H04N 13/275* | (2018.01) |
| *H04N 13/00* | (2018.01) |
| *H04N 13/10* | (2018.01) |
| *H04N 13/25* | (2018.01) |

(52) U.S. Cl.
CPC ........... *G06T 7/596* (2017.01); *H04N 13/243* (2018.05); *H04N 13/271* (2018.05); *G06T 2207/10012* (2013.01); *H04N 2013/0081* (2013.01)

(58) Field of Classification Search
CPC .. H04N 13/271; H04N 13/275; H04N 13/293; H04N 13/25
USPC ........................ 348/48, 51, 42, 47
See application file for complete search history.

(56) References Cited

U.S. PATENT DOCUMENTS

| | | | | |
|---|---|---|---|---|
| 2007/0110298 A1* | 5/2007 | Graepel | ................. | G06V 40/28 |
| | | | | 345/619 |
| 2016/0148433 A1* | 5/2016 | Petrovskaya | .......... | G02B 27/01 |
| | | | | 345/633 |
| 2016/0269714 A1* | 9/2016 | Rhemann | ............... | G06V 40/70 |

* cited by examiner

*Primary Examiner* — Daquan Zhao
(74) *Attorney, Agent, or Firm* — Straub & Straub; Michael P. Straub; Stephen T. Straub

(57) ABSTRACT

Camera arrays including multiple cameras which are spaced at various distances from one another are implemented and used. Multiple camera pairs with very different camera baselines between the cameras allows for reliable depth determinations to be made. Disparity information obtained by comparing images of a closely spaced camera pair are used to limit the search for matching image portions of images of a more distantly spaced camera pair. This allows searching for matching image portions to be constrained in a way that the complexity of searching for matching image portions can scale at a lower rate than the rate at which the baselines between cameras increases. This allows depth determinations to benefit from the accuracy obtained from using large camera baselines in a manner that is efficient from a processor utilization perspective since comparing image portions can be processor intensive if implemented without the benefit of constraints.

30 Claims, 11 Drawing Sheets

CAMERA ARRAY AND METHODS OF USING CAPTURED IMAGES FROM A CAMERA ARRAY FOR DEPTH DETERMINATION PURPOSES

FIELD

The present application relates to camera arrays suitable for supporting stereoscopic depth determinations and methods of using camera arrays and/or images captured by a camera array to make stereoscopic depth determinations.

BACKGROUND

Stereoscopic depth, e.g., distance, determinations are often used to estimate the depth to objects in a captured image, e.g., the distance from a camera to the object captured in the image. Stereoscopic depth determinations rely on cameras spaced apart from one another capturing an image of the same object which will then appear at different locations in the images captured by the cameras due to the cameras being physically spaced apart from one another. Cameras of a stereoscopic camera pair are used to capture images of an object which are then compared. The difference between where a portion of an object appears in a first image captured by a first camera of the stereoscopic camera pair and where the same portion of the object appears in a second image captured by a second camera of the camera pair is often referred to as a disparity. The disparity, i.e., difference in location in the captured images, is indicative of the distance to the object from a camera in the camera pair. Based on knowledge of the distance between the cameras used to capture the first and second images, the distance to the object can be determined once corresponding image portions captured by the cameras of a stereoscopic camera pair are identified and disparities are determined for the matching image portions.

With stereoscopic depth determination, for a depth estimate corresponding to a portion of an image to be made, a corresponding portion of a second image needs to be identified so that the depth can be estimated based on the difference, e.g., disparity, in locations between the corresponding pixels and the known camera spacing.

Searching a second image, to find a corresponding portion of a first image, can be computationally complex and normally involves comparing portions of the first image to portions of the second image for a large number of disparities that are being considered.

To reduce the computational complexity in some known systems the first and second images are first downsampled and then a portion of a first downsampled image is compared to the second downsampled image to determine a correspondence and initial disparity determined based on a match found between the downsampled portion of the first image and a downsampled portion of the second image. The disparity for a first image portion determined from the downsampled image is then used in limiting the search for a corresponding full resolution portion of the second image corresponding to the full resolution first image portion.

While disparities determined based on matching portions of downsampled images is used in some known systems to limit the range of disparities checked when comparing full resolution portions of the same images to reduce the number of disparities considered when comparing portions of full resolution versions of the same images, such an approach has several disadvantages. The downsampling can eliminate fine details in an image and can result in image portions of a first image being matched to image portions of a second image which in fact do not match. This can result in the disparity determined based on the match of downsampled image portions being erroneous in some cases which in turn can result in an erroneous match or failure to find a matching image portion when the range of disparities checked on the full resolution images is restricted or otherwise limited based on a disparity determined by comparing portions of downsampled images.

While various techniques exist for searching to find a matching image portion, e.g., pixel or group of pixels, the search process often remains time consuming. Furthermore, in the case of using downsampled image portions as a starting point, the reliability of the method can be reduced as result of using disparities determined based on downsampled images to restrict the disparities considered when comparing full resolution image portions.

While downsampling can be one source of error or a cause of reduced reliability when making depth determinations, a failure of multiple cameras to capture an image of the object for which a depth determination is to be made is another source of potential error when generating a depth map.

Objects in front of cameras act as obstructions and can occlude, e.g., block from view, a portion of an object or scene area. Occluded areas will differ based on camera position relative to the object occluding the view of an object.

Due to occlusions a surface visible in an image captured by a first camera may not be visible in the image captured by the second camera, e.g., an object may block the view of a surface visible to one camera in an array but not the other.

As a result of an occlusion, an object may be included in an image captured by a first camera but may not be included in an image captured by a second camera. A comparison of images captured by the first and second cameras can result in an erroneous depth determination since any match found with regard to an object visible in a first image captured by the first camera and an image captured by the second camera, in which the object was occluded from view, will be an erroneous match.

In order to limit the effect of occlusions in a final depth map, three cameras are sometimes used, with typically the center one of the three cameras being used as a reference camera. A depth map is generated by matching pixels of the reference camera to pixels of the outer cameras. The theory being that now there is a greater chance that at least one of the two outer cameras will also capture a given region of the reference camera. This is to mitigate the risk that a large baseline two camera system might have large occluded regions given that the number and/or size of occlusions tends to increase as the spacing between the cameras increases. The increase in the occlusions, as the spacing between camera increases, is due in part to the fact that the greater the distance between the cameras, the greater the difference in the fields of view, which increases the chance that an object visible by one camera might not be visible to the other camera due to an obstruction.

In at least some implementations involving three cameras, a center camera is positioned near or at the center between the two outer cameras, along a line extending between the two outer cameras. FIG. 1 is a diagram 100 showing an exemplary 3 camera array 104 including a first camera C1 106, a second camera C2 108, which serves as a reference camera, and a third camera C3 110. The distance between the cameras is visible on the distance scale 102. Assuming a 1 meter (100 cm) distance between the cameras C1 106 and C3 110, there is a 40 centimeter spacing between the first outer camera C1 106 and the center reference camera C2 108 while there is a 60 centimeter spacing between the reference camera C2 108 and the second outer camera C3 110. In the FIG. 1 example cameras C1 106 and C2 108 operate as a first camera pair for stereoscopic depth determination and cameras C2 108 and C3 110 operate as a second camera pair for stereoscopic depth determination purposes. While the spacing in the camera pairs (C1 106, C2 108) and (C2 108, C3 110) is not identical, such spacing is relatively uniform which is a common feature of camera arrays with the cameras of stereoscopic camera pairs being uniformly spaced or nearly uniform in spacing, e.g., with cameras spacing between cameras used as pairs for stereoscopic depth determinations normally often differing by not more than 12 the distance between the cameras of any one of the camera pairs.

In the FIG. 1 example the distance to the outer cameras of each pair can be expressed as a 60/40 ratio with the distance between the cameras in the second camera pair being 60 cm and the distance between the cameras in the first camera pair being 40 cm which results in the 60/40 ratio.

With stereoscopic images the greater the distance between the cameras used to capture the images used in the stereoscopic depth determination the more accurate the depth estimate tends to be. This is because as the distance between cameras is increased, the difference in where an object will appear in the images captured by the different cameras will also increase. The difference, i.e., disparity, in the position where an object or pixel appears in two images is in some embodiments expressed in terms of a pixel offset from the location where the corresponding pixel appears in the other image of an image pair. The disparity associated with a pixel is directly related to, and thus indicates, the distance from the reference camera(depth) to the object corresponding to the pixel to which the disparity corresponds. For this reason, the terms disparity and depth are sometimes used interchangeably. Disparity is often measured by comparing the difference in position between portions of two matching image portions where the image portions correspond to images captured by different cameras. The determined disparity serves as the basis of the distance estimate also referred to as a depth estimate. Thus, disparity of an object in the captured images and distance to the object correspond to each other, with the knowledge of the camera positions allowing for object distance from a camera or camera array to be determined by the disparity of a pixel corresponding to the object in the captured images.

Given that the distances between the reference camera and each of the outer cameras is the same or approximately the same in conventional arrays, e.g., such as the 60/40 array shown in FIG. 1, similar accuracy in terms of a distance estimate is achieved in such an embodiment whether the distance to an object is estimated based on the reference image and an image captured by either one of the other cameras in the array. Thus, there is little benefit from using the disparity generated from images from the first camera pair (C1 106, C2 108) as opposed to using the images captured by the second camera pair (C2 108, C3 110) for the depth measurement.

From an accuracy perspective it would be desirable if the distance between cameras used for stereoscopic purposes could be as large as possible. Unfortunately, camera arrays are often subject to physical size constraints due to where they need to be mounted and the total area available for mounting. In view of the above, it should be appreciated that there is a need for improved camera array configurations and/or improved methods of making disparity determinations, which can be used for stereoscopic depth determinations, and/or improved methods for determining depth from images captured by a camera array. It would be desirable if in some, but not necessarily all cases, depth could be determined without the need to use down sampling for initial disparity determinations which can increase the risk of erroneous matches between image portions in some cases.

SUMMARY

In at least some embodiments a camera array includes multiple camera pairs that are used to capture images for depth determination purposes. A reference camera may be, and sometimes is, common to the multiple camera pairs. Rather than having equal or relatively equal spacing between the cameras in each camera pair, in some embodiments cameras of different camera pairs have camera spacing which differ by a multiple of the shortest camera pair spacing, e.g., with the difference in spacing between cameras of the different camera pairs often being 2, 4, 5, 7, 8, 9, 10 or more than that of another camera pair in the array.

In some but not necessarily all embodiments, the array includes cameras arranged along a straight line. In at least some embodiments, an outermost camera of the array is used as the reference camera rather than a more central camera. The use of outermost camera as the reference camera, in some embodiments, has the advantage of maximizing the baseline in the system between cameras. While use of the outermost camera as the reference camera has advantages from the perspective of maximizing the camera baseline for at least one camera pair, using an outermost camera as the reference camera is not required in all embodiments.

In various embodiments of the invention, images captured by the cameras of a closely spaced camera pair are first processed. Portions of the captured images, e.g., one or more pixels, in an image captured by one camera of the closely spaced camera pair, are compared to an equally sized image portion in an image capture by the other camera in the camera pair to identify corresponding portions between the two images that match and disparities, e.g., location differences, for the individual corresponding matching image portions. The disparities generated from the images captured by the closely spaced camera pair are then used to predict where matching portions will be located between the images captured by the more distantly spaced camera pair (e.g., camera pair with the largest baseline).

The disparity information from the closely spaced camera pair is used in constraining the pixel search process with regard to the more distantly spaced camera pair. Thus, in some embodiments the search for matching images portions in images corresponding to the cameras of a distantly spaced camera pair becomes a constrained search where the search area in the images corresponding to the second camera pair is limited based on the depth information obtained from the initial disparity/stereoscopic depth determination made using the images from the cameras of the more closely spaced, e.g., first, camera pair.

Given the large spacing between the cameras in distantly spaced camera pairs, occlusions might prevent a match for some pixels making a depth determination for such pixels based on simply the images from the distantly spaced camera pair impossible in some areas. In accordance with one feature of the invention, for pixels which depth can not be determined based on the images captured by the distantly spaced (large baseline) camera pair, e.g., due to occlusion or specular reflection or other reasons, the depth information obtained from the first closely spaced camera pair is used. In the rare cases where a match and corresponding disparity was not able to be determined for the closely spaced camera pair but a match is able to be determined based on images captured by cameras of a more distantly spaced (e.g., larger baseline) camera pair, the disparity determined from the more distantly spaced camera pair will be used after having been determined without the benefit, e.g., ability, to constrain the search for a matching image portion, based on a disparity, which was determined from the images captured by the closely spaced camera pair.

Accordingly, in one or more embodiments, a depth map, generated in accordance with the present invention, may include depths determined based on images captured by a distantly spaced camera pair. However, in some cases, e.g., where occlusions were present for one or more camera pairs, the depth map will include a combination of depths, with some of the depths having been generated based on images captured by the distantly spaced camera pair and other depths, e.g., corresponding to occluded areas from the perspective of the distantly spaced camera pair, having been generated based on the images captured by the closely spaced camera pair. This approach has the advantage of higher accuracy with regard to all or most of the area for which a depth map is generated than would be possible using a camera array where the cameras of camera pairs used for depth determination have the same or nearly the same spacing between cameras.

The method of the invention also allows for the search process to be implemented, with regard to captured images, efficiently with the depth information obtained from the images captured by the closely spaced camera pair being used to constrain the search for matching image portions implemented with regard to the images captured by the distantly spaced camera pair. This has the advantage of reducing the complexity of the search, as compared to the case where a search for a matching image portions is performed without the benefit of location information obtained from a search for matching image portions conducted on images captured by cameras of a more closely spaced camera pair.

Not all embodiments need to include all the features discussed in the summary above with some embodiments including less than all the discussed features. Numerous variations and features will be discussed in the detailed description which follows.

BRIEF DESCRIPTION OF THE FIGURES

FIG. 3D is a fourth part of a flow chart showing a stereoscopic depth determination process implemented in accordance with one exemplary embodiment of the invention.

DETAILED DESCRIPTION

Figure 2:
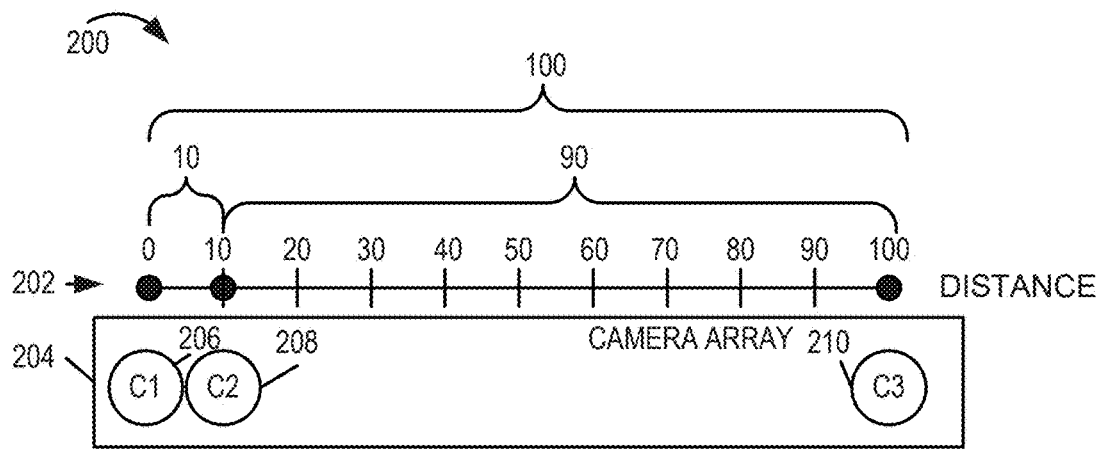
FIG. 2 shows a camera array implemented in accordance with an exemplary embodiment which is well suited for making stereoscopic depth determination in accordance with the present invention.
Figure 9:
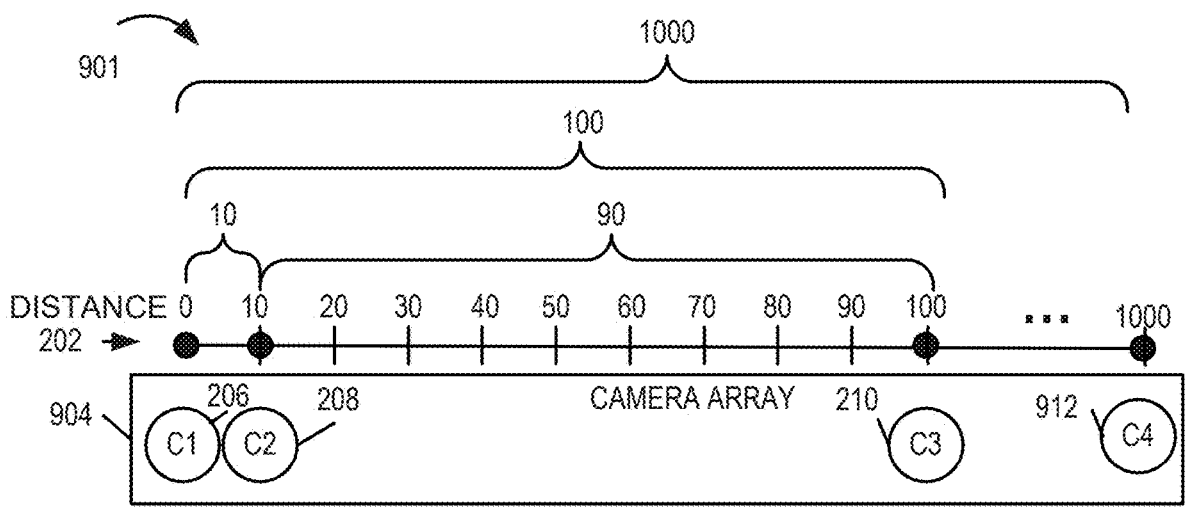
FIG. 9 is a diagram of a camera array implemented in accordance with another exemplary embodiment which is well suited for making stereoscopic depth determination in accordance with the present invention and which is used in the system of FIGS. 6, 7 and 8 in some embodiments.
Figure 3A:
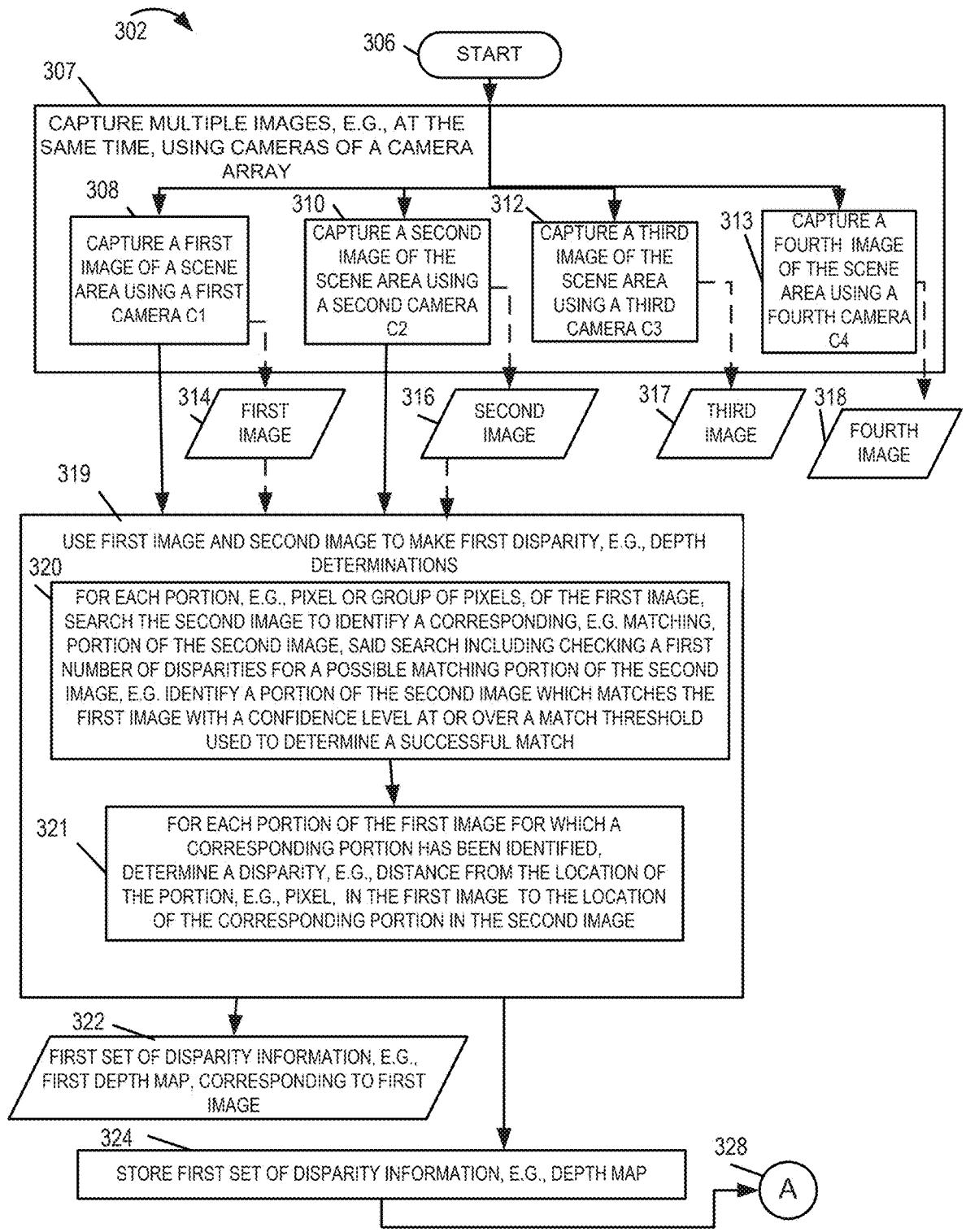
FIG. 3A is a first part of a flow chart showing a stereoscopic depth determination process implemented in accordance with one exemplary embodiment of the invention.
Figure 3B:
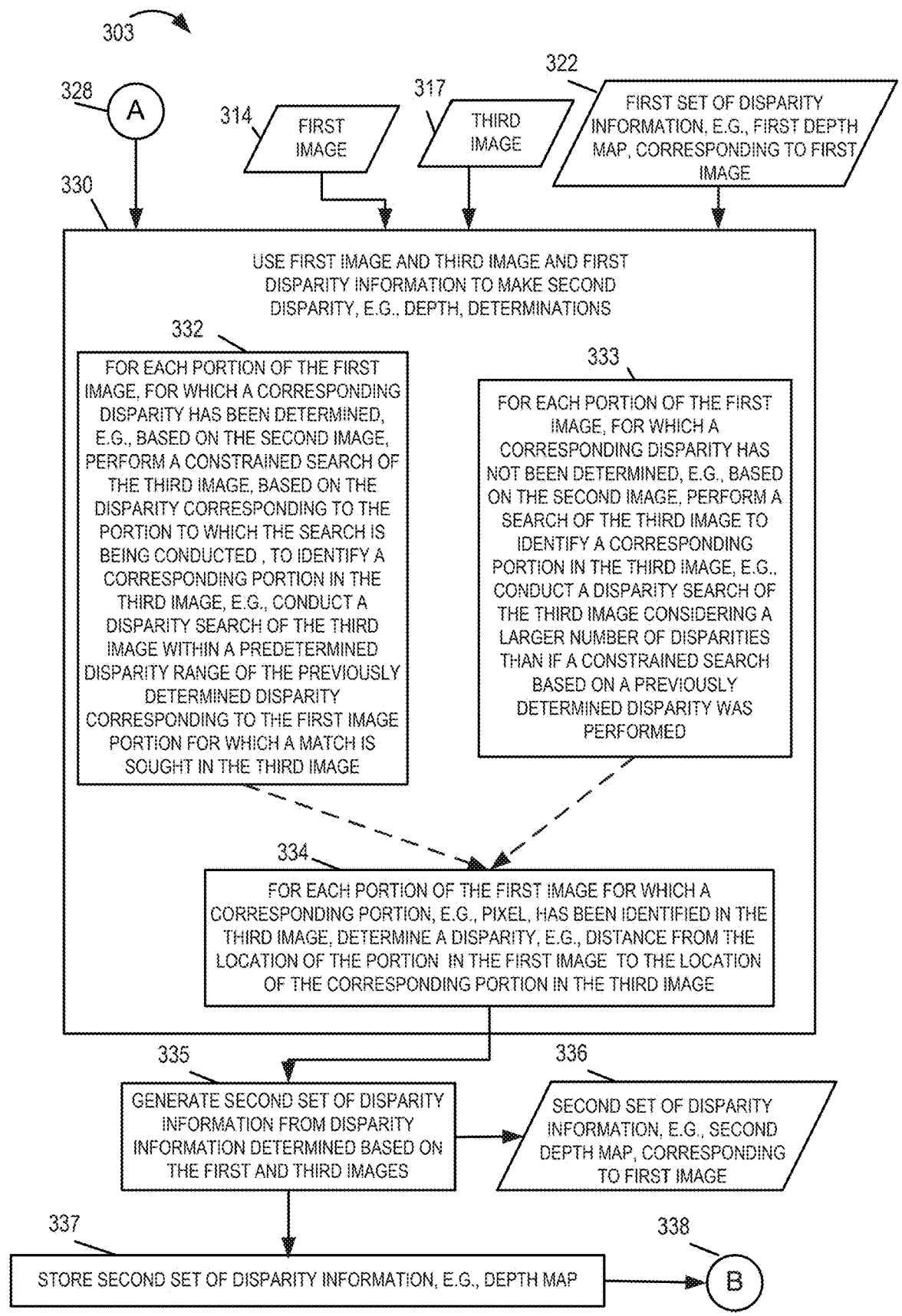
FIG. 3B is a second part of a flow chart showing a stereoscopic depth determination process implemented in accordance with one exemplary embodiment of the invention.
Figure 3C:
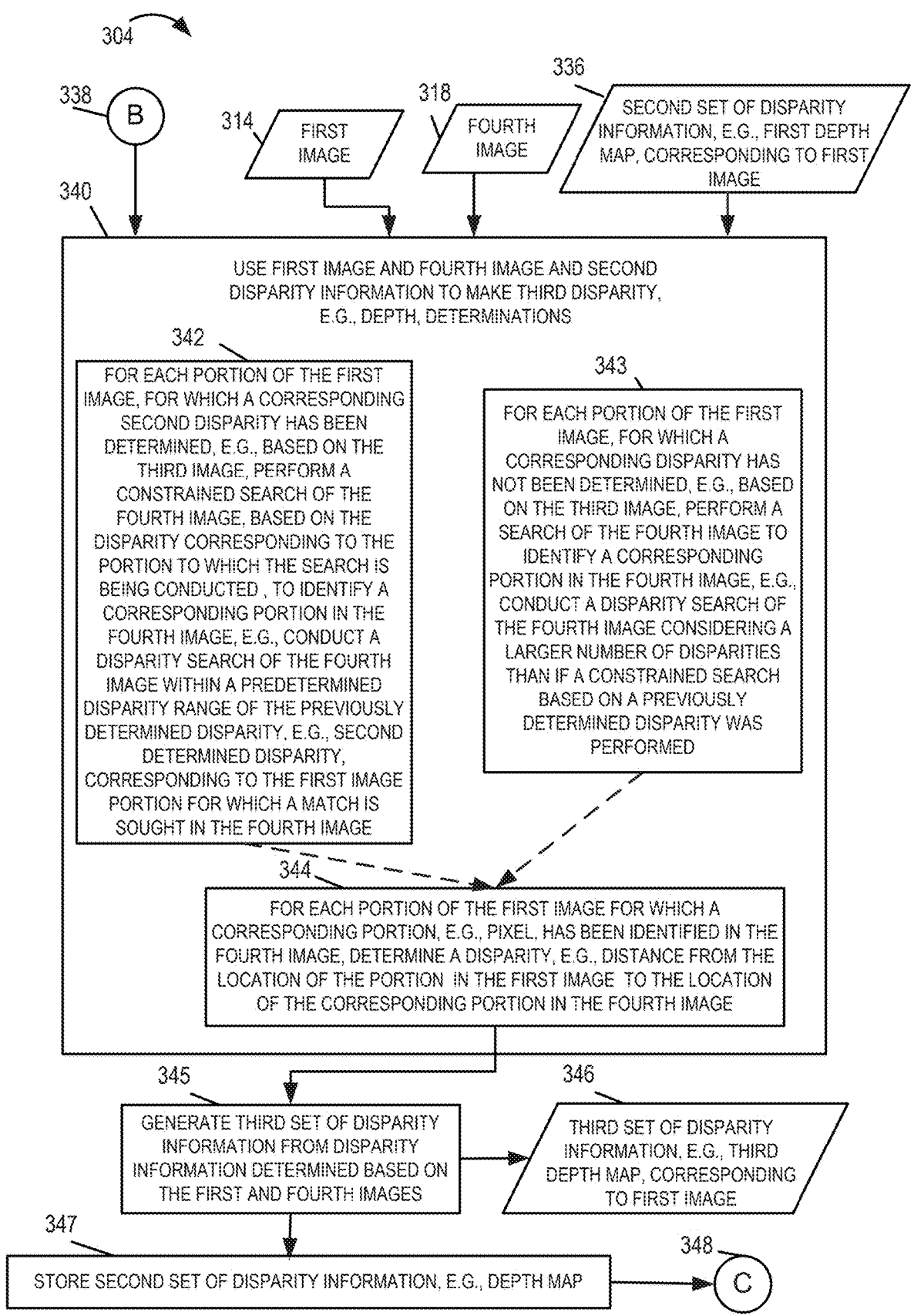
FIG. 3C is a third part of a flow chart showing a stereoscopic depth determination process implemented in accordance with one exemplary embodiment of the invention.
Figure 3:
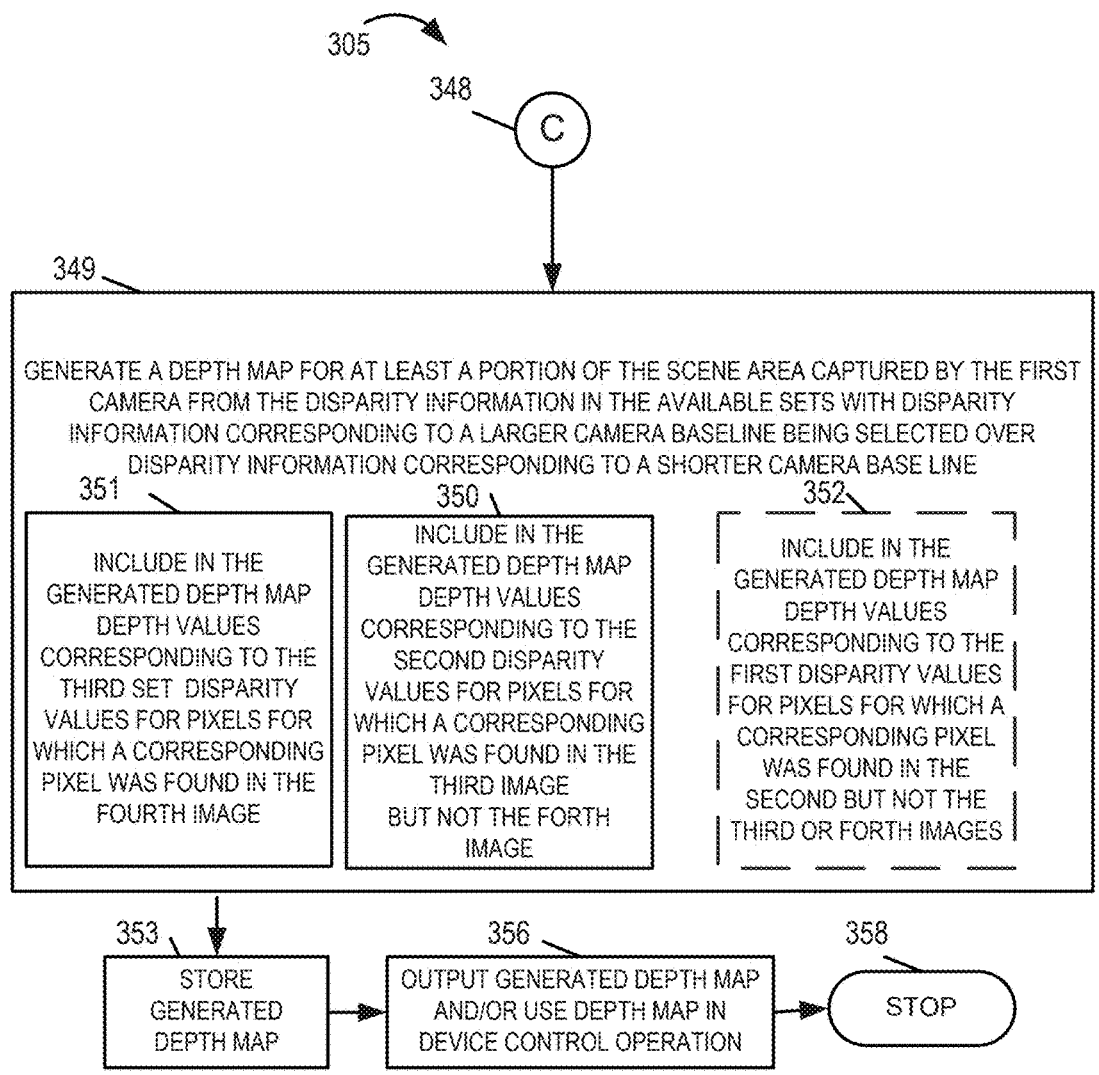
FIG. 3 is a diagram showing how FIGS. 3A, 3B, 3C and 3D can be combined to form a complete flow chart showing steps of a method implemented in one exemplary embodiment.
Figure 3:
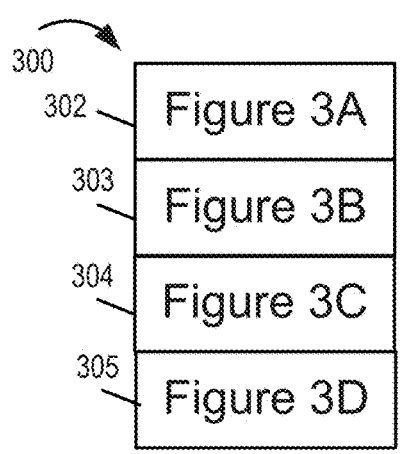

FIG. 2 is a diagram 200 showing an exemplary camera array 204, implemented in accordance with the invention, and which is used in some embodiments to provide images used by the depth determination method shown in FIG. 3 which comprises the combination of FIGS. 3A, 3B and 3C. FIG. 9 is a diagram 901 showing another camera array 904 which includes an additional camera C4 912, in addition to the cameras C1 206, C2 208 and C3 210. Camera array 904 effectively includes the camera array 204 plus an additional camera C4 912 to support stereoscopic determinations using a much larger baseline than is available from using the cameras C1 206, C2 208 and C3 210.

The camera array 204 includes three cameras, which can be treated as two camera pairs, for stereoscopic depth determinations. Using camera C1 206 as a reference camera, cameras C1 206, C2 208 can be, and sometimes are, used as a first camera pair with a relatively short baseline, e.g., distance, between the center of the two cameras C1 206, C2 208. Cameras C1 206, C3 210 can be used as a second camera pair with the second camera pair having a longer baseline between the cameras. In the FIG. 9 embodiment, cameras C1 206 and C4 912 can be used as yet another camera pair e.g., a third camera pair having a much larger baseline, e.g., a baseline 100 times that of the first camera pair C1 206, C2 208.

Both the camera array 204 of FIG. 2 and the camera array 904 of FIG. 9 can be used with the method which will be discussed below with regard to FIG. 3 in which a disparity determined using a shorter baseline pair is used to constrain a search for a matching image portion when comparing portions of image captured by a camera pair having a longer baseline.

The camera arrays 204 and 904 each include a first camera C1 206, a second camera C2 208 and a third camera C3 210. For purposes of the example, the baseline measurements can will be described in centimeters with the overall distance between the center of camera C1 and C3 being 100 centimeters or 1 meter. Such a 1 meter array is practical for a wide range of application but the overall dimensions are exemplary. Similar arrays, with other overall dimensions are possible while staying within the scope of the invention.

While a three camera array is suitable for a large number of applications and may be preferred in many cases for cost or space reasons, arrays with more than 3 cameras are possible. For example, FIG. 9 is a diagram 901 showing a 4 camera array 904 which includes the first camera C1 206, the second camera C2 208, the third camera C3 210 and a fourth camera C4 912. The distance between cameras C1 206 and C4 912, comes out to 10 meters, which is 100 times the distance between cameras C1 206 and C2 208 given that C1 206 and C2 208 are 10 cm apart. Such a distance is suitable in various applications and is well suited for use in a stationary camera array, e.g., mounted on a building, bridge or other rigid support structure.

While in the FIG. 2 and FIG. 9 examples the cameras are arranged in a straight line, the methods of the present invention can be used with cameras arranged in other configurations where the camera pairs in the array have significantly different baselines, e.g., camera to camera spacing which are multiples of the shortest camera baseline.

Figure 10:
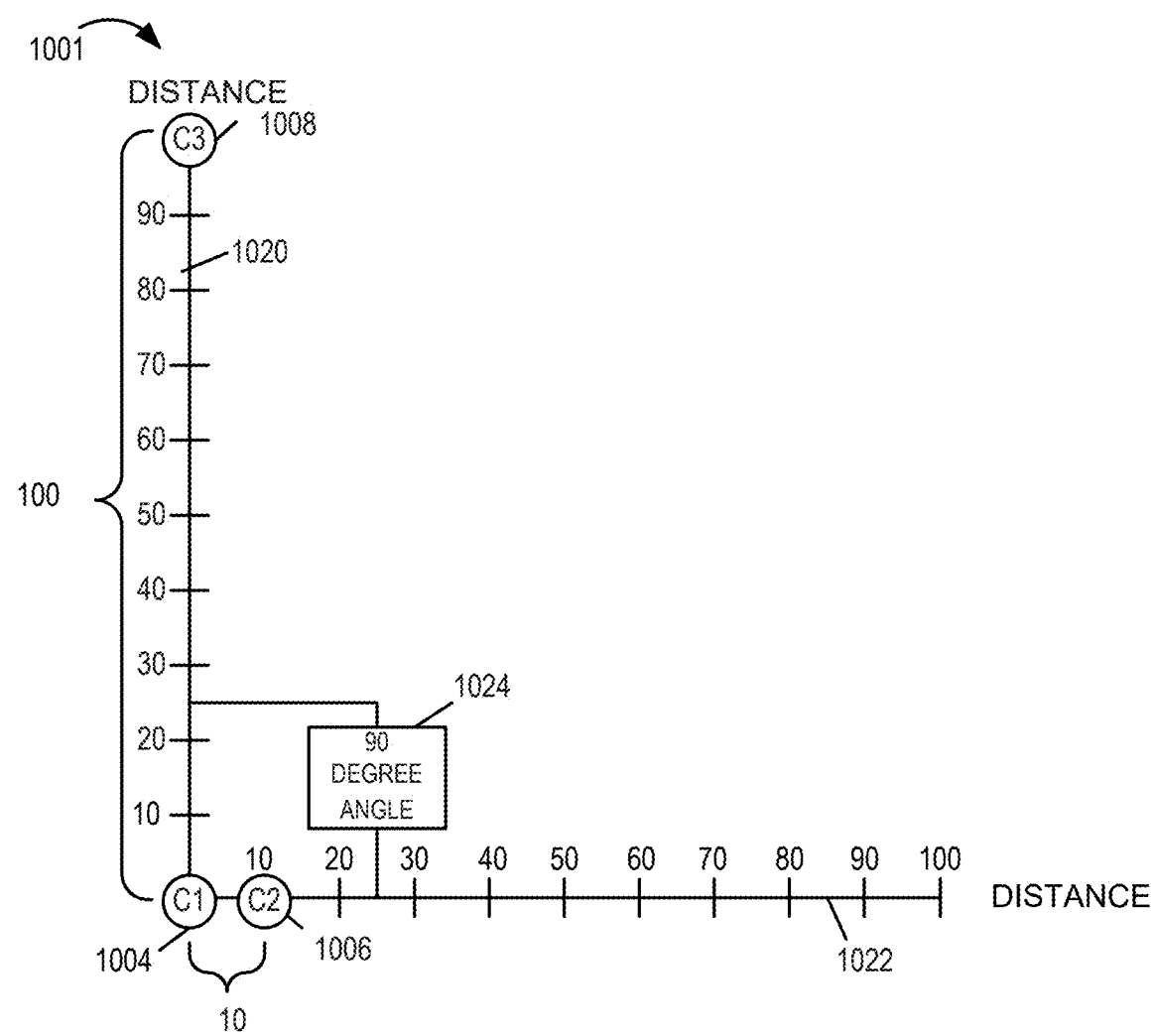
FIG. 10 is an exemplary array in which the cameras of different camera pairs are spaced along lines with the lines being at angles to each other.

FIG. 10 is a diagram showing a camera array 1001 which includes a first camera 1004, a second camera 1006 and a third camera 1008. Camera C1 is used as a reference camera and is an element of a first stereoscopic camera pair including camera C1 1004 and C2 1006 which are arranged on a first line, e.g., a horizontal line 1022 relative to the ground. The first camera pair has a 10 cm base line as in the FIG. 2 embodiment. Cameras C1 1004, C3 1008 are a second stereoscopic pair with a baseline of 100 cm which is 10 times the baseline of the first camera pair. The cameras of the second camera pair C1 1004, C3 1008 are positioned on a second, e.g., vertical, line which is at a non-zero angle, e.g., a 90-degree right angle 1024 with respect to the first line 1022 on which the first camera pair C1 1004, C2 1006 are located.

In the FIG. 10 cameras C1 1004, C2 1006 and C3 1008 are all mounted in what can be considered to be a vertical mounting plane with the cameras being positioned at various locations in the plane relative to the camera used as a reference camera, e.g., camera C1 1004. FIG. 10 shows that multiple baselines which are multiples of one another can be used in accordance with the invention without requiring all the cameras of the array to be placed on the same straight line. In some embodiments the baseline are integer multiples of one another but in other embodiments they are non-integer multiples. In most embodiments the difference in baselines between the camera pairs is greater than 2 with larger baselines being preferred in many embodiments, e.g., baselines of 3, 4, 5, 6, 7, 8, 9, 10 or larger, being preferred over shorter base lines given that the accuracy of the stereoscopic depth determinations increases with an increase in the baseline between cameras. Unfortunately, due to mounting and/or space limitations the length of the baseline may be limited by physical space and/or mounting constraints. The arrangement of FIG. 10 is useful where space in one direction may be limited and space for mounting cameras at another location around a reference camera may be available. Camera arrays with cameras positioned at numerous locations relative to the reference camera are possible and arrays with 3, 4 or more cameras arranged at locations which do not all fall on a straight line are contemplated and within the scope of the invention.

In at least some implementations of the FIGS. 2, 9 and 10 embodiments, the cameras C1 206 or 1004, C2 208 or 1006, C3 210 or 1008 and C4 912 are of the same type and resolution. For purposes of explaining the invention references will be made primarily to the arrays of FIGS. 2 and 9 with the understanding that the array of FIG. 10 could alternatively be used.

By using the same type of cameras for each camera in an array, the image comparison process can be simplified as compared to other embodiments where different camera types are used for some or all of cameras C1 206, C2 208, C3 210, and C4 912. In many cases the cameras C1 206, C2 208, C3 210, C4 914 of the arrays 204, 209 shown in FIGS. 2 and 9, are operated to capture images in parallel, e.g., at the same time. This is particularly useful when the cameras are mounted on a device, e.g., vehicle which may move and in which case it can be important that the images are captured at the same time to make sure that the distance to the objects captured by the different cameras is not affected by possible motion, which might have occurred between image captures if the cameras capture images at different times. However, in cases where the cameras are stationary, e.g., not mounted to a moving vehicle, and the scene is stationary, the cameras can be controlled to capture images at different times with the images then being used to perform stereoscopic depth determinations because of the stationary nature of the cameras in such cases.

In various embodiments camera C1 206 is used as a reference camera and depth estimates are made with respect to the location objects included in an image captured by this camera by comparing the location of the objects to where they are positioned in the image(s) captured by another camera C2 208, C3 210 or C4 912. For purposes of explaining the invention consider that the distance between the centers of the cameras in the second camera pair C1 206, C3 210 is 10 times the distance between the centers of the cameras C1 206, C2 208 of the first camera pair. Consider also that the distance between the centers of the cameras C1 206 and C4 912 of the third camera pair is ten times the distance between cameras C1 206 and C3 210 of the second camera pair. Thus, the baseline of each of the camera pairs increases by a factor of 10 with the distance between the cameras in the third camera pair C1 206, C4 912 being 100 times the distance between the cameras of the first camera pair C1 206, C2 208 and 10 times the distance between the cameras of the second camera pair C1 206, C3 210.

From the above discussion, it should be appreciated that both FIGS. 2, and 10 which show camera arrays which each include a total of three cameras, and FIG. 9, which shows a four camera array, each have camera pairs with baselines of different lengths. The baselines between cameras of the stereoscopic camera pairs used to determine depth grow by multiples greater than two. The multiplier in the base line can be the same for different camera pairs in the array but need not be the same. For example the difference in camera pair baseline between cameras of a second camera pair can be expressed as the multiplier N, where N is a positive non-zero value of 2 or more, while the difference in the baseline between the second and third camera pairs can be expressed as a multiplier value Z where Z is a positive non-zero value of 2 or more and can be the same or different from N. In various embodiments N and Z are 2, 3, 4, 5, 6, 7, 8, 9, 10 or some other larger value. The use of longer baselines has the advantage of increasing accuracy of the depth determinations.

Using multiples of the smallest baseline for the baselines of other camera pairs makes using the information from a shorter camera pair in constraining the search of the image corresponding to the larger camera pair relatively straight forward when determining how to scale a disparity value corresponding to a shorter baseline camera pair for use in constraining a search for a match of image portions corresponding to a camera pair with a larger camera pair baseline.

In some embodiments the baselines between camera pairs in an array grow geometrically by a factor of N where N is positive non-zero value. In some but not all embodiments N is an integer but this is not a requirement. Consider that in one embodiment if X is the smallest baseline in the array, e.g., 10 cm in the FIG. 9 example, the baseline of the next one is XN where, in some embodiments, the number N indicates the number in the sequence of camera pairs, with growing baselines being used. For example, in the FIG. 9 example, the first camera pair C1 206, C2 208, with the shortest separation of 10 cm, has a baseline of 10 cm corresponds to N=1. The second camera pair C1 206, C3 208 corresponds to N=2 and has a baseline of XN=102 cm=100 cm. The third camera pair C1 206, C4 912 corresponding to N=3 has a baseline of XN=103 cm=1000 cm=10 meters.

The accuracy of the depth determinations increases with the camera spacing in the camera pair being used for depth determination. This is because as the distance between the cameras in a camera pair increases, the amount of shift in location of an object from one camera image to the camera image captured by the other camera in the camera pair will also increase and be a function of the distance to the object, whose image is captured. The larger displacement makes accurate/precise measurement of the displacement easier. While the disparity for a given distance will be small for closely spaced cameras of the first camera pair C1 206, C2 208, the disparity for the given distance will be greater, e.g., about 10 times greater for the cameras C1 206, C3 210 of the second camera pair spaced 10 times further apart.

Thus, as the baseline increases geometrically, the quality of the depth estimates based on the determined disparity of the cameras spaced apart from each other will also increase, e.g., geometrically. However, by constraining the search for matching image portions in accordance with the invention based on previously determined disparity information, the number of disparities checked need not increase geometrically. For example, if 10 disparities are checked as part of trying to match a portion of the first and second images captured by cameras C1, 206, C2 208 as part of checking a possible search range corresponding to a range of depths, to check a similar depth range for the second camera pair C1 206, C3 210 having a baseline 10 times that of the first baseline, 10 times the number of checks would have to be made, e.g., 100 disparity checks would be made. In accordance with the invention rather than make such a large number of disparity checks, a smaller constrained search for matching image portions is made, with the searched disparities corresponding to a range centered around the disparity corresponding to the previously determined disparity obtained from the camera pair (e.g., C1 206, C2 208) with the smaller baseline. For example, if the first comparison resulted in a 5 pixel disparity, taking into consideration the increase in the baseline by a factor of 10, rather than search around a 50 pixel disparity with a range of +/−50 pixels for a search range of 100 pixels, the search for the second larger baseline is constrained to a smaller range, e.g., +/−30 pixels centered around a disparity of 50 where the disparity of 50 is just an exemplary number and not required by the search range of +/−50 pixels. The disparity of 50 around which the second search is centered corresponds to the previously determined 5 pixel disparity at the 10× smaller camera baseline separation for the camera pair C1, C2 but is scaled up by a factor of 10 to take into consideration the 10× large baseline of the second camera pair C1 206, C3 210.

In some embodiments in the case where a match and disparity were not determined based on the initial smaller camera baseline, a larger full range search equivalent to the original search range for the first camera pair is performed on the images captured by the second camera pair C1 206, C3 210. For example, if a constrained search could not be made for an image portion because a disparity was not determined based on the comparison of images captured by the shorter baseline camera pair C1 206, C2 208, a search of 10 (the disparity search range for the first short camera pair) times the increase in the base range (10) would be made requiring a check of 100 disparities.

Thus, for portions for which an initial disparity determination was successfully made 60 disparity checks (corresponding to a range extending from −30/+30 around the previously determined disparity 5 scaled to 50 due to the 10× large baseline) might be made because a constrained search is performed for matching image portions but in the case of a portion for which a first disparity was not successfully determined the comparison process for the second camera pair would check 10×10 or 100 possible disparities.

Note that the use of constrained searching based on a previously determined disparity allows for the number of disparity checks made as the base distance between the cameras increases by N to increase by a factor less then N, e.g., by a factor equal to or less than 0.3N, 0.4N, 0.5N, 0.6M or even 0.7N depending on the particular embodiment. This is possible because the disparity estimate made at the smaller baseline is reliable but not very accurate. In various embodiments down sampling is not used on the image portions being compared to avoid the errors, image degradation and/or possible false matches that can be caused by such down sampling. Notably in some embodiments the disparity determinations are made on full resolution images without down sampling prior to the disparity determination. Thus, errors and/or mismatches that might result from the use of down sampling are avoided in such embodiments. While down sampling is not used in many embodiments, the invention does not preclude the use of down sampling and down sampling can and is used in at least some embodiments.

For purposes of the example, the exemplary distance measurements shown with respect to the placement of cameras in FIGS. 2 and 9 are in centimeters with the overall distance between the center of camera C1 206 and C2 208 being 10 centimeters, the distance between camera C1 206 and C3 210 being 100 centimeters and the distance between camera C1 206 and C4 912, shown in the FIG. 9 example, being 1000 centimeters.

In accordance with the invention, disparities determined by comparing images captured by cameras which are more closely spaced are used to constrain the search for matching image portions when images captured by camera pairs which are spaced further apart. For example, if camera C1 206 is used as the reference camera, in one embodiment disparity determinations are first made by comparing a portion of image captured by camera C1 206 with that captured by camera C2 208. A constrained search for matching the same image portion captured by camera C1 206 is then made using an image captured by camera C3 210 with the search being constrained based on the disparity results obtained by comparing portion of image captured by camera C1 206 with an image captured by camera C2 208. With the disparity information obtained from the comparison of the portion of image captured by camera C1 206 with the image captured by camera C3 210, a constrained disparity search is then made when comparing the same image portion captured by C1 206 with the image captured by camera C4 912 in the case where the 4 camera array of FIG. 9 is used. Given the greater separation of the cameras C1 206 and C4 912, the disparity information and corresponding depth information, will be more accurate than that obtained from comparing images captured by C1 206 and C2 208 or C1 206 and C3 210. By comparing images or image portions that have not been downsampled, accurate disparity determinations are made with the accuracy of disparity determinations for image portions, and thus depth estimations for those image portions, increasing as the results from comparing images captured by cameras having increasing separation.

As shown along distance line 202, the first camera C1 206 is positioned at distance 0, the second camera C2 208 is positioned at distance 10 and the third camera C3 210 is positioned at distance 100. Notably in such an arrangement cameras C1 206 and C2 208 are relatively close to each other, while both of these cameras C1 206 and C2 208 are relatively distant from camera C3 210. In fact, the distance between camera C3 210 and camera C2 is 9 times the distance between camera C1 206 and camera C2 208. In such an arrangement, given the 9 times greater distance between cameras C2 208 and C3 210, as compared to the distance between cameras C1 206 and C2 208. C2 208 may be used as the reference camera with cameras being grouped into pairs C1 206, C2 208 and C2 208 and C3 210. The distance/depth determinations made based on the images captured by camera pair (C2 208, C3 210) are likely to be 9 times more accurate than the distance estimates made based on the images captured by camera pair (C1 206, C2 208) assuming the pixels of the images can be reliably matched given the greater distance between the cameras in pair (C2 208, C3 210) relative to camera pair (C1 206, C2 208).

Because of the close proximity of cameras C1 206 and C2 208 of cameras C1 206 and C2 208, they are likely to have very similar fields of view and there are likely to be fewer occlusions, due to objects that might block the view of one of the cameras but not the other. Thus, fewer occlusions are likely to be present with regard to the first camera pair C1 206, C2 208, but the risk of occlusions will, in general, tend to increase as the baseline between cameras increases.

Assuming a low likelihood of occlusions for camera pair C1 206, C2 208 an advantage can be obtained in camera spacing if camera C1 206 is used as the reference camera in each of the camera pairs rather than the middle camera C2 208. While in some embodiments a middle camera is used as the reference camera, in many embodiments an outermost camera of the camera array 204, 904 is used as the reference camera to maximize the baseline between the cameras in each camera pair used for disparity/depth determinations.

Given fewer occlusions when determining disparities based on the images captured by the cameras C1 206, C2 208, valid depths can be determined for all or virtually all portions, e.g., pixels, in the field of view of cameras C1 206 and C2 208 by simply using the images captured by these cameras. The depth determinations can be made by checking relatively few disparities given that the cameras C1 206, C 208 are closely spaced and for a wide range of distances objects are not likely to shift much in terms of position between the images captured by the different cameras of the short baseline camera pair. Thus, the disparity determinations based on images captured by the first camera pair can be made by performing a reasonable number of disparity checks, avoiding, at least in some embodiments the need for downsampling to reduce the complexity or number of disparity checks to be made.

Figure 1:
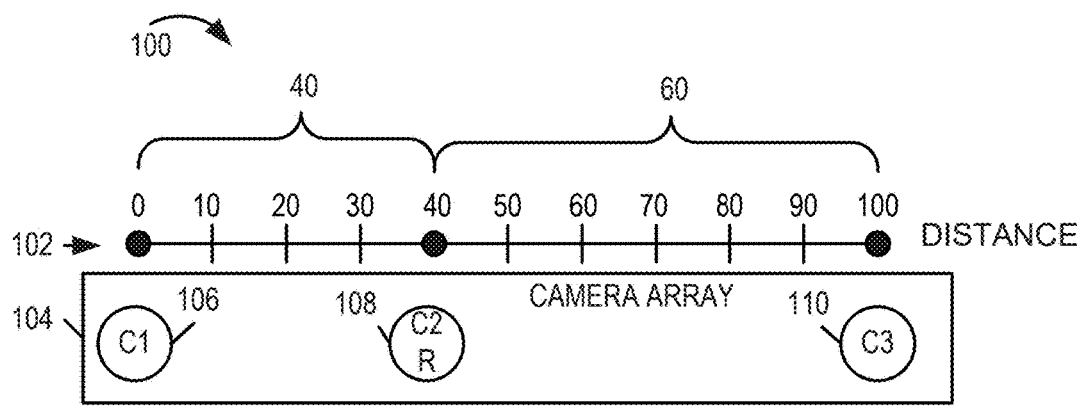
FIG. 1 shows a prior art camera array used for stereoscopic depth determinations.

Unfortunately, the depth determinations made based on images captured by cameras C1 206, C2 208, while reliable, may not have as high a degree of accuracy as desired due to the small amount of displacement between the cameras C1 206, C2 208 and thus the relatively small displacement between corresponding pixels in the images captured by these cameras. Significantly however, the large displacement between cameras C2 208 and C3 210 or even larger displacement between cameras C1 206 and C3 210 can provide images which allow for much higher accuracy depth/distance determinations given the large distance between these cameras as compared to cameras C1 206 and C2 208. Furthermore, the large distance between the cameras C1 206, C2 210 or C1 206, C3 210 as compared to the camera pairs (C2 108, C1 106) and (C2 108, C3 110) of the prior art camera array 104 shown in FIG. 1. Thus, it should be appreciated that the FIG. 2 approach provides more accurate depth estimates than are possible with the FIG. 1 camera pairs (C2 108, C1 104) and (C2 108, C3 110) and FIG. 1 approach.

In accordance with one feature of the invention that is used in some but not necessarily all embodiments, the outermost camera C1 206 of the closely spaced camera pair (C1 206, C2 208) is used as the reference camera with the second camera pair being used being (C1 206, C3 210). This is possible since the spacing between the cameras C1 206, C2 208 generally results in few occlusions, as compared to the FIG. 1 arrangement where cameras C1 106 and C2 108 have much larger differences in their angles of view and thus a greater likelihood of occlusion as compared to the cameras of camera pair C1 206, C2 208 of FIG. 2.

In various embodiments of the invention, images captured by the closely spaced cameras C1 206 and C2 208 are first processed. Portions of the captured images, e.g., one or more pixels, in the image captured by camera C1 206 are compared to the pixels of the image captured by camera C2 208 to identify corresponding pixels between the two images and disparities for individual corresponding matching image portions, e.g., pixels, are determined. The disparities generated from the images captured by the first camera pair, e.g., the closely spaced camera pair (C1 206, C2 208), are then used to predict where matching portions will be located between the images captured by the more distantly spaced camera pair which could be either (C1 206, C3 210) or (C2 208, C3 210). Thus, by using the depth information from the closely spaced camera pair the pixel search process with regard to the more distantly spaced camera pair becomes a constrained search, where the search area in the second image is limited based on the depth information obtained from the initial stereoscopic depth determination made using the images from the closely spaced camera pair.

Given the large spacing between the cameras in distantly spaced camera pairs, occlusions might prevent a match for some pixels, making a depth determination for such pixels, based on simply the images from the second distantly spaced camera pair impossible in some areas. In accordance with one feature of the invention, for pixels for which depth can not be determined based on the images captured by the distantly spaced (large baseline) cameras, e.g., due to occlusion or specular reflection or other reasons), the depth information obtained from the first closely spaced camera pair (C1 206, C2 208) is used. In the rare cases where a match and corresponding disparity was not able to be determined for the closely spaced camera pair, but a match is able to be determined for the more distantly spaced camera pair, the disparity determined from the more distantly spaced camera pair will be used after having been determined without the benefit, e.g., ability, to constrain the search, based on a disparity which was determined from the images captured by the closely spaced camera pair.

Accordingly, a depth map generated in accordance with the present invention may include depths determined based on images captured by the distantly spaced camera pair (C1 206, C3 210) or (C2 208, C3 210). However, in some cases, e.g., where occlusions were present for one or more camera pairs, the depth map will include a combination of depths, with some of the depths having been generated based on images captured by the distantly spaced cameras and other depths, e.g., corresponding to occluded areas from the perspective of the distantly spaced camera pair, having been generated based on the images captured by the closely spaced camera pair (C1, C2). The described approach has the advantage of higher accuracy and reliability with regard to all or most of the area for which a depth map is generated than would be possible using the prior art camera array of FIG. 1.

The methods of he invention allow for the search process implemented with regard to captured images to be implemented efficiently with the depth information obtained from the images captured by the closely spaced cameras of one camera pair to be used to constrain and thus reduce the complexity of the pixel matching search implemented with regard to the images captured by a camera pair with more distantly spaced cameras.

FIG. 3 is diagram 300, which shows how FIG. 3A 302, FIG. 3B 303, FIG. 3C 304 and FIG. 3D 305 are to be combined, to form a complete flow chart including the steps of a method implemented in one exemplary embodiment which is used to generate a depth map, that is stored, output and/or used in a device control operation.

FIG. 3A is a diagram 302 which shows the steps of a first portion of an exemplary method 300 implemented in accordance with the invention. The apparatus 604 implementing the method 300 includes a camera array (204, 904, 612 or 1001) which includes three or more cameras arranged in accordance with the invention. For purposes of explaining the invention reference numbers corresponding to the array 904 will be used but the method is not limited to such an array.

Figure 6:
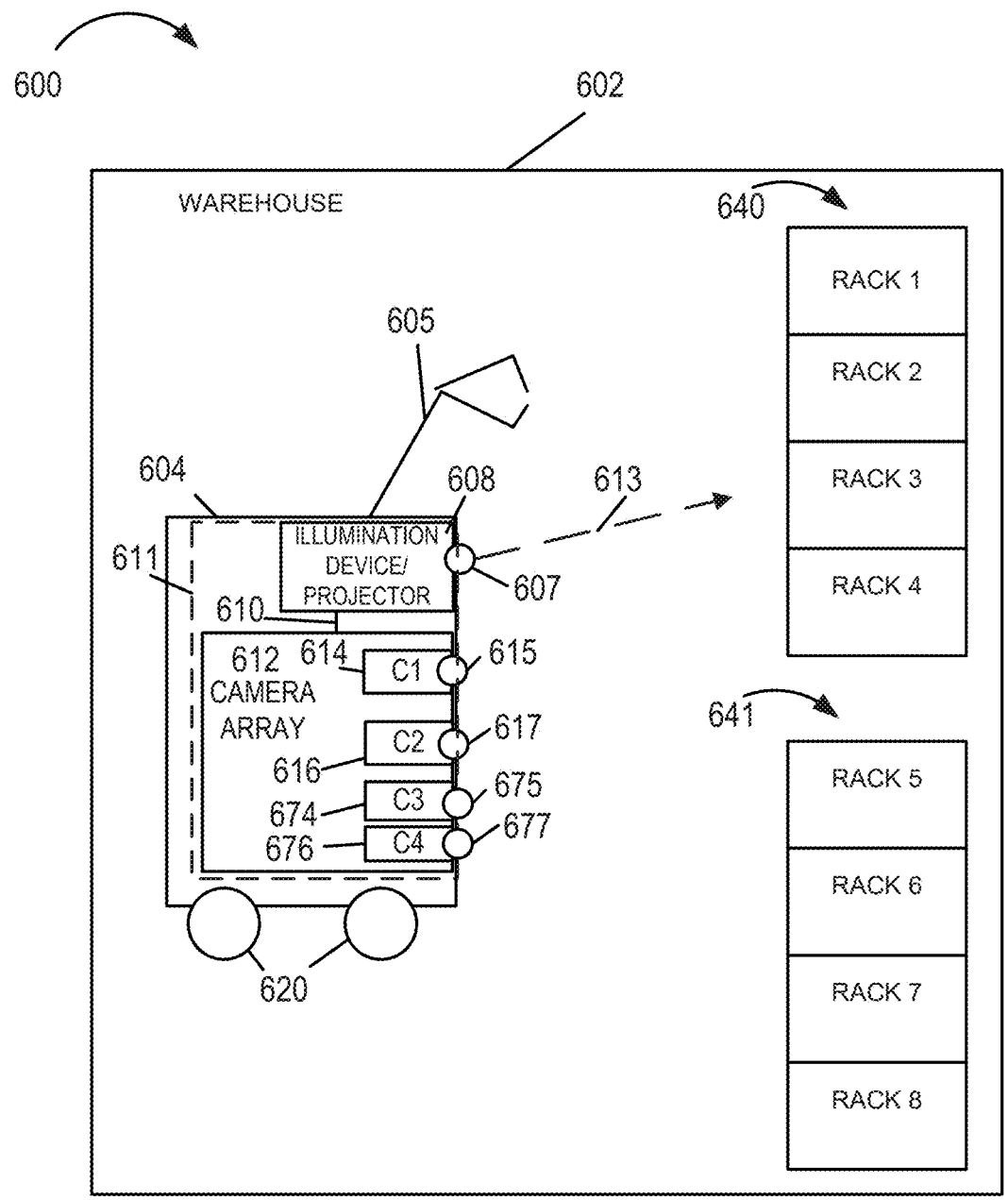
FIG. 6 is a diagram showing an exemplary apparatus including an illumination device and image capture system implemented in accordance with one embodiment of the invention in an environment where the apparatus may be used to capture images and generate depth maps in accordance with the invention, e.g., for device control purposes.
Figure 7:
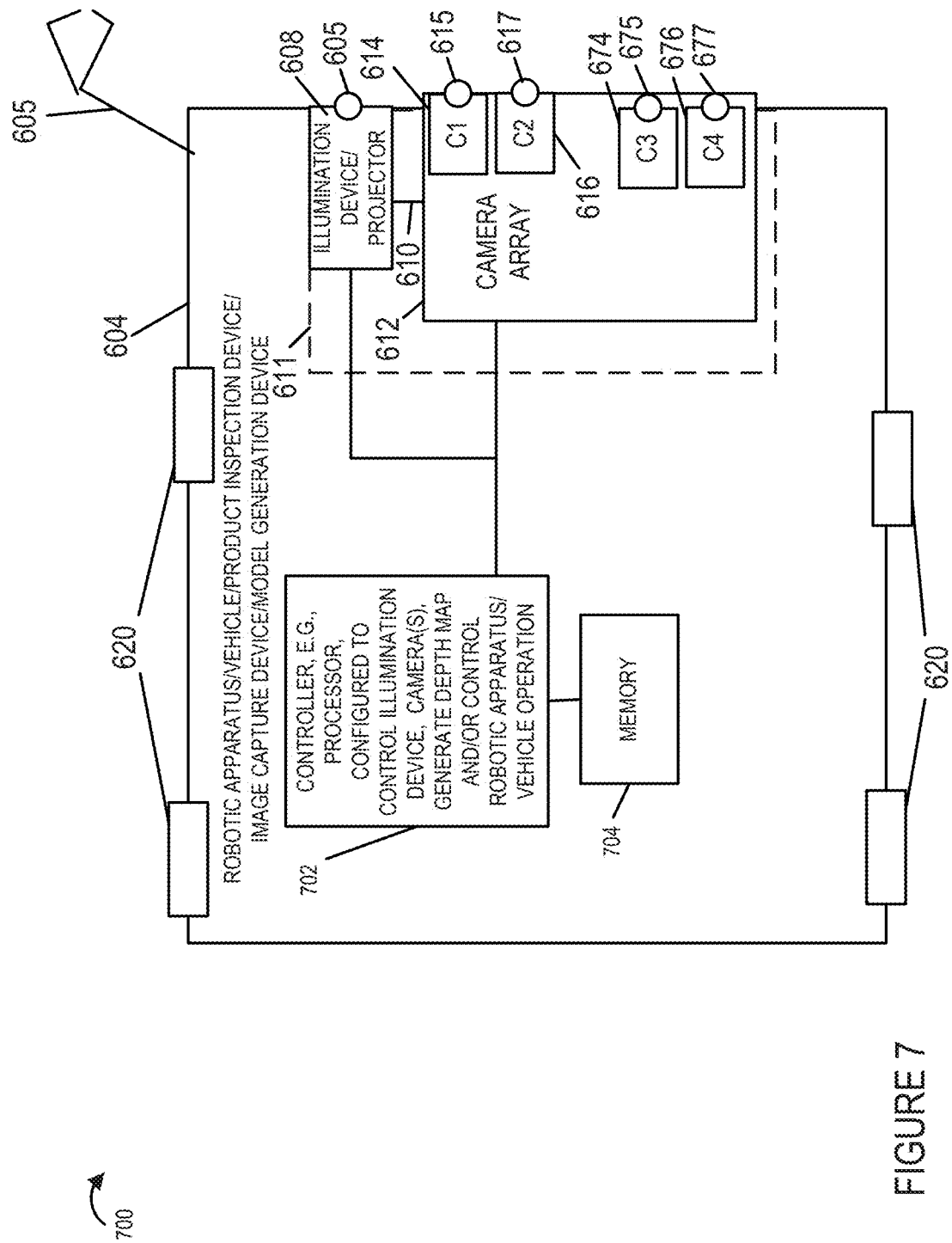
FIG. 7 is a diagram showing the exemplary apparatus shown in FIG. 6 in greater detail.
Figure 8:
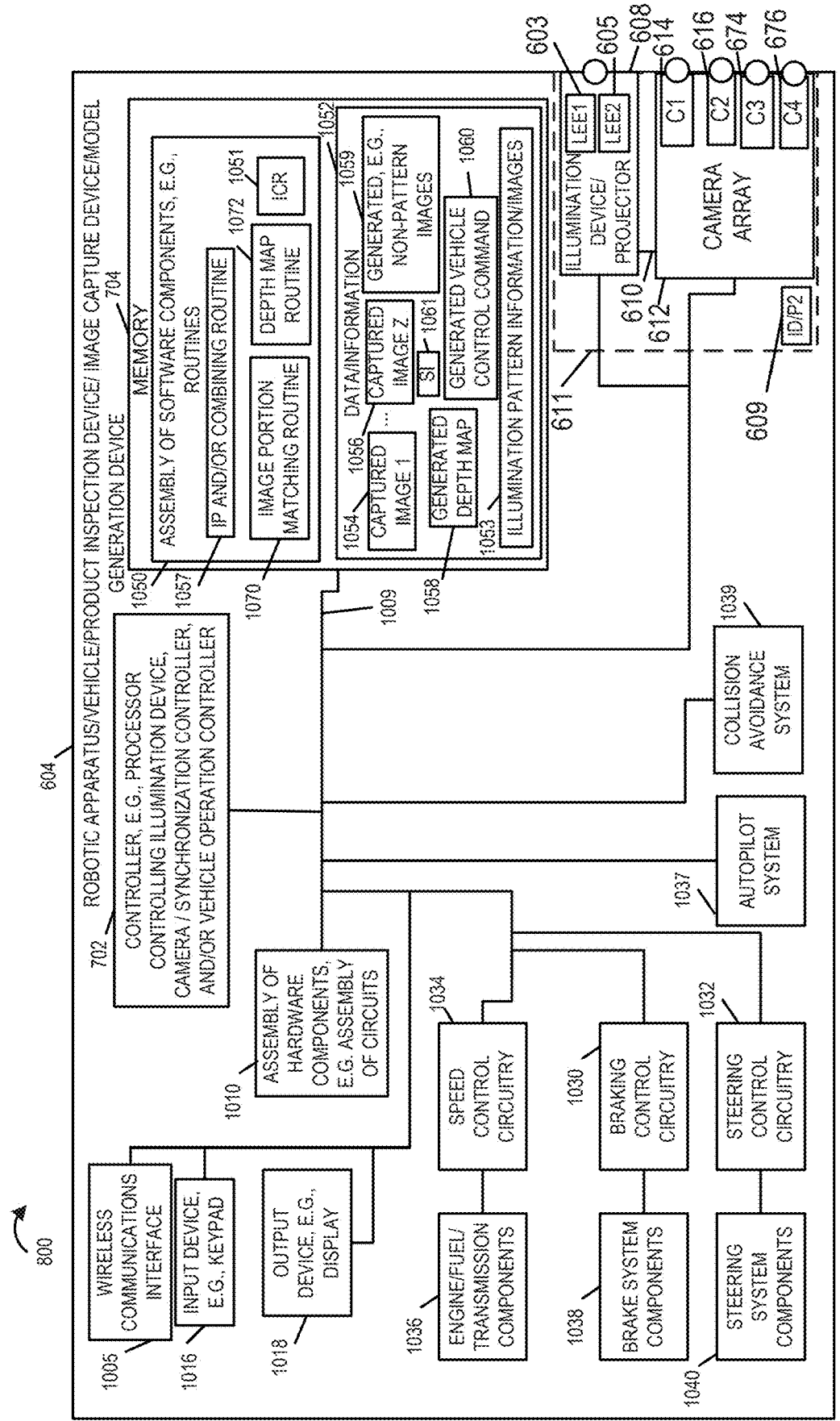
FIG. 8 is another diagram showing the exemplary apparatus shown in FIG. 6 in greater detail.

The method begins in start step 306 with a device such as the robotic apparatus 604, shown in FIGS. 6, 7 and 8 being powered on and beginning operation. Operation proceeds from start step 306 to image capture step 307, in which multiple images are captured, e.g., at the same time or potentially at different times where the capture array and objects in a scene are stationary.

In step 307 multiple images are captured, e.g., each image being captured by a different camera of the camera array. In some embodiments step 307 includes image capture steps 308, 310, 312, and optionally step 313 which is implemented in some embodiments which use a 4 camera array.

In step 308 a first image 314 of a scene area is captured using a first camera C1 206. In step 310 a second image 316 of the scene area is captured by the second camera C2 208. In step 312 a third image 317 of the scene area is captured using the third camera C3 210, and in step 313 a fourth image 318 of the scene area is captured using a fourth camera C4 912. Step 313 is optional in that it is implemented in 4 camera embodiments but not 3 camera embodiments.

Operation proceeds from image capture step 307 to step 319, in which the first image 314 and second image 316 are used to make disparity determinations, e.g., depth determinations, for portions of the first image 314 where the image portions may include one or more pixels. As part of step 319 a disparity, e.g., a value indicating a difference in position between the location of the image portion in first image 314 and the location of the image portion in the second image 316, is determined. The image portion corresponds to an object surface, and this difference in position corresponds to a depth or distance from the reference camera C1 206 to the object surface and thus can be considered a depth.

Step 319 in which a first set of disparities are determined from a first image 314 captured by the first camera 206 and a second image 316 captured by the second camera C2 208 includes step 320 and step 321. In step 320 for each portion, e.g., pixel or group of pixels, of the first image 314 the second image 316 is searched to identify a corresponding, e.g., matching, portion of the second image 316. The search performed with regard to finding a matching image portion includes checking a first number of disparities in an attempt to identify a matching portion of the second image 316. In some embodiments identifying a matching image portion includes identifying an image portion match with a confidence level that exceeds a match threshold used to determine a successful match. Thus, it is possible, in embodiments where a confidence or match score is considered, to determine if a match was found for a particular image portion as a result of the search. In the case of the searching performed in step 320, it is expected that matches will be found for all or the vast majority of image portions of the first image 314 for which searches are conducted to find a match.

Operation proceeds from step 320 to step 321, in which, for each portion of the first image 314 for which a match was found, a disparity is determined. The disparity includes a value indicating how much the matching image portion is shifted from its location in the first image 314 to the location in the second image 316 where a match was found and thus indicates a positional change in the object between the first and second images 314, 316 which is due in part to the different locations of the first camera C1 206 and second camera C2 208 in the camera array 204 or 904. Step 319 generates a first set of disparity information 322 which is stored in step 324. In some embodiments, the disparity information is on a per pixel basis, with each pixel being treated as an image portion for which a match is sought, and a disparity value stored, but in other cases an image portion, to which stored disparity information corresponds, may be a group of pixels.

Operation proceeds from step 319 to step 324, in which the first set of disparity information is stored in memory for future use, e.g., in constraining searches of images for matching image portions of images captured by another camera pair and/or generation of a depth map to be output and/or used for device control.

Operation proceeds from step 324 to step 330 of FIG. 3B via connecting node A 328. In step 330 images captured by the second camera pair C1 206, C3 210 are processed to make second disparity determinations for the portions of the first image 314 captured by the reference camera C1 206, but this time with respect to the third image 317, which was captured by the third camera C3 210 taking into consideration the first set of disparity information 322 generated from comparing portions of the first and second images 314, 316.

In step 330 a disparity check is made in step 332 for each portion of the first image 314 for which a disparity was successfully determined in step 319. Step 330 includes steps 332, 333 and 334. Step 332 is performed to determine a disparity for portions of the first image 314 for which a first disparity was determined in step 319. In step 332 for each portion of the first image 314 for which a corresponding disparity was previously determined, e.g., based on the second image 316, a constrained search of the third image 317 is made for a matching image portion. In some implementations this involves searching in the third image 317 within a disparity range that is determined based on the previously determined disparity corresponding to the portion of the first image 314 for which a match is sought in the third image 317. The constrained disparity search range is smaller than the search range used in step 333, which is implemented for portions of the first image 314 for which a corresponding disparity was not previously determined.

In step 333 a search of the third image 317 is conducted to find matches for image portions of the first image 314 for which a disparity was not previously determined. Given that a previously determined disparity is not available for containing the search range, in step 333 a larger number of disparities are considered for finding a possible matching image portion in the third image 317 corresponding to an image portion of the first image 317 than are considered in step 332.

While each search for a matching image portion performed in step 333 will include comparisons to more possible matching image portions than in step 332, a disparity value will have been determined for all or most of the image portions in step 332, with step 333 being performed for a small fraction or none of the image portions for which a disparity determination is made in step 330.

Operation proceeds from matching steps 332 and 333 to step 334, in which a disparity is determined for each image portion of the first image for which a match was found in the third image 317. Because of the larger baseline of the second camera pair C1 206, C3 210 as compared to the baseline of the first camera pair C1 206, C2 208, the second set of disparity information will be relatively more accurate than the first set of disparity information, e.g., up to 10 times more accurate in the case of an increase in the baseline by a factor of 10 between the first and second camera pairs. Notably, the increase in accuracy can be achieved without an increase of the number of disparities which need to be considered for most image portions since the disparities determined from the images corresponding to the first camera pair C1 204, C2 206 can be used to constrain the disparity search range for most if not all image portions.

Operation proceeds from step 334 to step 335, in which the disparity information generated in step 334 for different portions of the first image 314 is combined into a second set of disparity information 336, which is then stored in step 337 for future use prior to operation proceeding via connecting node B 338 to step 340 of FIG. 3C.

The processing in FIG. 3C is performed in embodiments where a four camera array is used such as the one shown in FIG. 9. In cases where a three camera array is used, the processing shown in FIG. 3C which relates to generating disparity information based on the content of the fourth image 318 is skipped and operation proceeds directly to step 349 of FIG. 3D rather than to step 340.

The processing in step 340 is similar to that which was performed in step 330 but with the processing being performed using the first and fourth images 314, 318 and with the second disparity information 336 being used to constrain searches for matching image portions when the disparity information is available for an individual portion of the first image 314 for which a match is sought in the fourth image 318.

In step 340 a disparity check is made in step 342 for each portion of the first image 314 for which a disparity was previously successfully determined, e.g. in step 330 or step 319. Step 340 includes steps 342, 343 and 344. Step 342 is performed to determine a disparity for portions of the first image 314 for which a disparity was previously determined with the disparities determined in step 330 (e.g., the second determined disparity) being used to constrain the search for a matching image portion when such a disparity is available otherwise the disparity (first disparity) obtained in step 319 being used to constrain the search if it is available.

In step 342 for each portion of the first image for which a corresponding disparity was previously determined, e.g., preferably based on the third image 317, a constrained search of the fourth image 318 is made for a matching image portion. In some implementations this involves searching in the fourth image 318 within a disparity range that is determined based on the previously determined disparity (e.g., second determined disparity) corresponding to the portion of the first image 314 for which a match is sought in the fourth image 318. The constrained disparity search range is smaller than the search range used in step 343 which is implemented for portions of the first image 314 for which a corresponding disparity was not previously determined.

In step 343 a search of the fourth image 318 is conducted to find matches for image portions of the first image 314 for which a disparity was not previously determined. Given that a previously determined disparity is not available for containing the search range, in step 343 a larger number of disparities are considered for finding a possible matching image portion in the fourth image 318 corresponding to an image portion of the first image 314 than are considered in step 342.

While each search for a matching image portion performed in step 343 will include comparisons to more possible matching image portions than in step 342, a disparity value will have been determined for all or most of the image portions in step 342, with step 343 being performed for a small fraction or none of the image portions for which a disparity determination is made in step 340.

Operation proceeds from matching steps 342 and 343 to step 344, in which a disparity is determined for each image portion of the first image for which a match was found in the fourth image. Operation proceeds from step 344 to step 345, in which the disparity information generated in step 344 for different portions of the first image 314 is combined into a third set of disparity information 346 which is then stored in step 347 for future use prior to operation proceeding via connecting node C 348 to step 349 of FIG. 3D. Because of the larger baseline of the second camera pair C1 206, C4 912 as compared to the baseline of the first camera pair C1 206, C2 208 and the baseline of the second camera pair C1 206, C3 210, the third set of disparity information 346 will be more accurate than the first and second set of disparity information (322, 336), e.g., up to 10 times more accurate than the second set of disparity information 336 and up to 100 times more accurate than the first set of disparity information 322 in the case of a first increase in the baseline by a factor of 10 between the first and second camera pairs and a second increase in the baseline by another factor of 10 between the second and third camera pairs. Notably, the increase in accuracy can be achieved without a corresponding increase in the number of image portions which are compared to find a match due to constraining the search range for comparisons based on previously determined disparity information.

In step 349 a depth map is generated for at least a portion of the scene area captured by the first camera C1 206 from the first, second and/or third disparity sets (322, 336, 346). In step 349 for a given portion of the first image 314 for which disparity information is available based on different camera pairs, the disparity information corresponding to the camera pair having the longest baseline will be selected for use in generating the depth map to be output. This means that disparity information from the third set corresponding to the third camera pair will be selected for use when available over disparity information corresponding to an image portion that is included in the second or third disparity sets. In some but not all embodiments, the final disparity information of corresponding to an image portion (e.g., pixel) can be and sometimes is generated by a normalized weighted average of the disparities from the smaller and larger baselines with a much greater weight on the larger baseline disparity. For example, the weighting can be directly proportional to the baseline length with a disparity corresponding to a longer baseline being given more weight than a disparity/depth corresponding to a shorter baseline when generating a weighted disparity/depth for an individual image portion.

The third disparity set of information 346 is not generated in cases where camera arrays with only 3 cameras are used, since a fourth image 318 is not captured in such embodiments. Thus, in step 349 disparity information from the second set of disparity information 336 will be preferred over disparity information from the first set of disparity information 322, when generating a depth map in a system which uses an array of three cameras.

Given that disparity information for some image portions may not be available in a given disparity set due to a failure to identify an image portion match when generating a particular disparity set, the depth map generated in step 349 may be based on information from one or more disparity sets, with disparity information corresponding to a smaller camera baseline potentially being less accurate, and therefore being less preferred, to disparity information from a set corresponding to a larger camera baseline such as the third disparity information set.

Step 349 includes in some embodiments step 351, 350 and/or step 352. Including depth information based on a less preferred disparity set when a value is not available from the highest quality disparity information set is optional in some embodiments. In step 351, which is performed when the third disparity information set 346 is available, depth values corresponding to the third set disparity values 346 are included in the depth map being generated. Each depth value may be generated by converting a disparity information value into a depth value, e.g., pixel value, used to indicate a depth when the depth map is in the form of an image and where each pixel of the image indicates a depth through, for example, the color and/or brightness of the pixel. While depth in terms of an actional distance is proportional to a determined disparity, the depth in terms of a physical distance from the reference camera will be small when the disparity is large and the depth in terms of a physical distance will be large when the disparity is small. Thus, the relationship between disparity and physical distance is one where distance is inversely proportional to distance with a large disparity indicating a short distance from the reference camera. This is because at great distances there will be little change in the location/position of the object in images captured by different cameras but for objects near the cameras, the shift or position change in the images of the objects location will be large.

In embodiments where the array is limited to including 3 cameras, there will be no fourth image and steps 351 will not be performed. Step 350 will be performed in cases of a 3 camera embodiment for image portions for which second disparity values were determined from first and third images while step 352 will be performed for image portion in which a disparity was determined from first and second images but not the third image. In step 350 second disparity values will be used in determining values to include in the depth map while in step 352 first disparity values will be used in determining depth map values for those image portions for which a second disparity value was not determined.

As part of step 349 disparity values are in some embodiments converted into depth values indicative of actual physical distances based on the known relationship between a disparity value and the physical depth from the reference camera to which the disparity value corresponds. The relationship between disparity value and physical depth is determined from the physical relationship, e.g., distance separation, between the cameras of the camera pair to which the display value corresponds. The distance between cameras is known and normally fixed for a given camera array.

In step 350 depth values corresponding to the second set disparity values 336 are included in the depth map being generated, e.g. for image portions, e.g., pixels, for which a corresponding image portion was found in the third image used to generate the second set of disparity values but for which a disparity value is not available in the third set of disparity information or in the case where there is no third set of disparity information due to the use of a three camera array as opposed to a four camera array. Step 352 involves including in the generated depth map depth values generated from disparity values included in the first set of disparity values 322. Depth information generated from the disparity values in the first set of disparity information 322 is normally of lower accuracy due to the short camera baseline of the first camera pair to which it corresponds. Accordingly, depth information generated in step 352 from the first set of disparity information 322 is normally included in the depth map being generated when depth information for an image portion is not available based on the second set of disparity information 336 or the third set of disparity information 346. In the case of a 3 camera array step 352 includes including in the depth map being generated depth values that are based on first stereoscopic depth determinations, for individual image portions for which a match between an image portion of the first image and an image portion of said third image was not determined due to a failure to find an image portion in said third image corresponding to an image portion of the first image With a depth map having been generated in step 349 from the disparity information sets which were generated, operation proceeds to step 353, in which the generated depth map is stored, e.g., in memory, to facilitate device control operations and/or to be output for other uses. Then, in step 356 the generated depth map is output, e.g., communicated to another device and/or used in a device control operation such as controlling vehicle speed, direction or picking up of an object using a robotic arm.

The method of FIG. 3 stops in step 358 with a depth map having been generated, but it should be appreciated that the steps of FIG. 3 can be performed repeatedly, e.g., on an ongoing basis, as a vehicle or robotic device moves and needs to be controlled through the use of updated depth maps or depth information which can be generated by the capture and processing of images on an ongoing basis.

Figure 4:
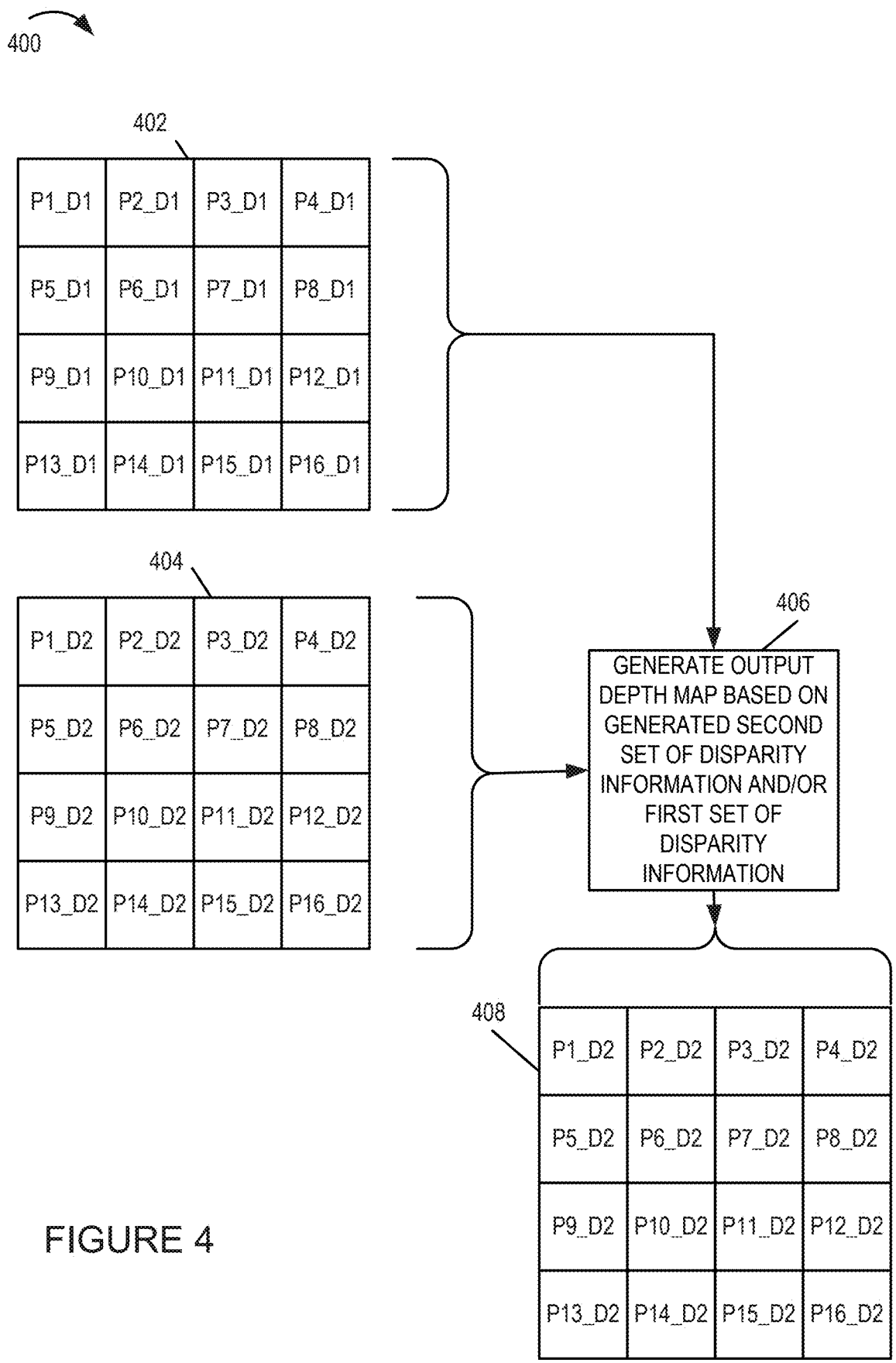
FIG. 4 is a diagram showing first and second sets of disparity information and a depth map, e.g., a third set of disparity information, generated by processing the first and second sets of disparity information.

FIG. 4 is a diagram 400 showing a first set of disparity information 402 and a second set of disparity information 404. FIG. 4 also includes processing step 406, which corresponds to depth map generation step 349 of FIG. 3D. A depth map, e.g., a third set of disparity information 408, is generated by processing the first and second sets of disparity information 402, 404, e.g., selecting which values to use as the basis of the depth map and optionally converting them to values that can be used as pixel value if a visual depth map is being generated and/or scaling the disparity values selected to be used to normalize them when based on different camera baselines, for inclusion in the depth map 408.

Figure 5:
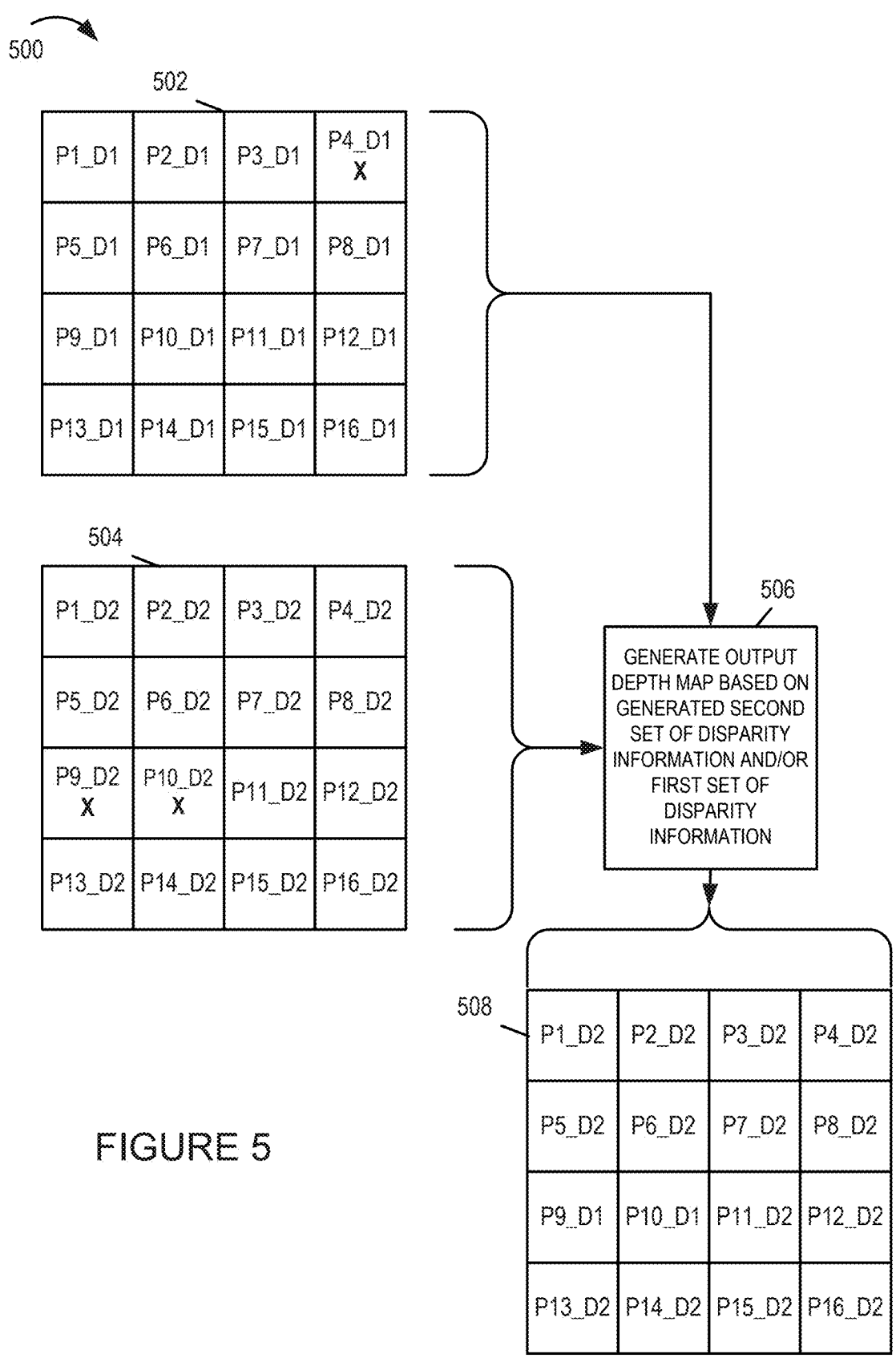
FIG. 5 is a diagram showing first and second sets of disparity information, e.g. with set having one or more undetermined disparity values due to occlusions blocking a portion of the images being compared to generate the disparity information, and a depth map, e.g., a third set of disparity information, generated by processing the first and second sets of disparity information.

FIG. 5 is a diagram 500 showing a first set of disparity information 502 and a second set of disparity information 504. FIG. 5 also includes processing step 506 which corresponds to depth map generation step 349 of FIG. 3D. A depth map, e.g., a third set of disparity information 508, is generated by processing the first and second sets of disparity information 502, 504, e.g., selecting which values to use as the basis of the depth map (or using a normalized weighted average in some embodiments) and optionally converting them to values that can be used as pixel value if a visual depth map is being generated and/or scaling the disparity values selected to be used to normalize them when based on different camera base lines, for inclusion in the depth map 508.

In the FIG. 4 and FIG. 5 examples each block represents an image portion P to which the disparity or depth information corresponds. D represents a disparity value and the number following the D indicates the disparity set to which the value corresponds. For example, P1_D1 is used to indicate the disparity value or disparity information for image portion P1 disparity information being for disparity set 1 generated from the closely spaced first camera pair C1 206, C2 208.

In FIG. 4 disparity values were generated in both the first and second sets of disparity information for all the image portions since no occlusions were present. The second set of disparity information 404 is more accurate than the first set 402 since it is based on a longer camera baseline than the first set of disparity information 402. Thus, in step 406, the disparity information in disparity set 404 will be used for generating the corresponding depth information values included in depth map 408 rather than the values in the first disparity information set 402.

In the FIG. 5 example, an X is included in each block representing an image portion for which a match could not be found and thus a disparity value could not be generated.

In the FIG. 5 example a match could not be found for the top rightmost portion of the image, e.g., a match for this portion was not determined between the first image captured by camera C1 206 and the second image captured by camera C2 208 and thus a usable disparity value could not be included for this image portion in the first disparity set 502. Accordingly, in the FIG. 5 example, value P4_D1 is not available in the first disparity set 502 but disparity values are available for all other image portions in the first disparity information step 502.

Also, in the FIG. 5 example a match could not be found between two portions of the first image captured by camera C1 206 and the third image captured by camera C3 210 as represented by the portions with Xs in the disparity information step 504. The second set includes more mismatches, which is to be expected given the larger camera baseline and thus increased risk of occlusion associated with the second disparity information set 504, as compared to the first disparity information set 502. In step 506, the more accurate disparity information of the second disparity information step 504 is preferred to the disparity information of the first disparity information set 502. Accordingly, the depth map 508 is generated from the available disparity values of the second disparity information set 504. but with the depth map information being generated from the disparity information of disparity information set 502 for those image portions (P9 and P10) for which disparity information is not available in the second set of disparity information 504.

Note that disparity information was not available in first disparity information set 502 for image portion P4 but was available for the other image portions. This means that when implementing the method of FIG. 3 disparity information was available in the FIG. 5 example to allow a constrained search to be conducted to find matching image portions to be used in generating disparity information 504 for all the image portions represented by blocks with the exception of image portion P4, for which disparity information was not available to constrain the disparity search. As a result, more disparities were considered when trying to find a match between image portion P4 of the first image captured by camera C1 206 and the third image captured by camera C3 210 than are performed for the other portions for which disparity values are available in the first disparity information set 502 for use in containing the search of the third image.

FIG. 6 is a diagram 600 showing a warehouse 602, in which a robotic device 604 capable of implementing the depth determination method of FIG. 3 is shown. The robotic device 604 includes a controllable arm 605 and wheels 620 and the robotic device can move and be controlled based on depth maps generated in accordance with the invention under control of a processor included in the device 604. The warehouse 602 includes a first set of racks 640 and a second set of racks 641 including shelves on which boxes or other items are stored and which can be picked or moved by the robotic device 604, e.g., to satisfy a customer order.

While explained in the context of a robotic device, it should be appreciated that the illumination system and/or camera capture system can be used in a wide variety of application including stationary applications such as monitoring of items, e.g., manufactured products, for quality control purposes and/or where a stationary robot is to used in manufacturing items. In such cases the illumination device 608 and/or camera array 612 may be mounted in a stationary or movable mount which can be part of or separate from the robot or other device in the area being monitored. In some embodiments the robotic device 604 is a vehicle with a pick arm 605.

The robotic device 604 includes an illumination and stereoscopic camera system 611 implemented in accordance with the invention and a processor capable of generating a depth map in accordance with the invention. The illumination and stereoscopic camera system 611 includes an illumination device 608 and one or more cameras C1 614, C2

616, C3 674, C4 676. The cameras are part of an array 612. The array 612 may be any one of the arrays 204, 904, or 1001 shown in FIG. 2, 9 or 10. The illumination device 608 in some embodiments is a light projector which can project images through lens 607. The images are in the form of frames and can display a pattern in some embodiments or provide uniform illumination in other embodiments. The illumination device 608 illuminates an area, e.g., a portion of the warehouse 602 including the racks 640 on which boxes may be, and sometimes are, positioned. In some embodiments the illumination device 608 is a collimated light projector, but collimated light is not used in all embodiments. The system can include multiple illumination devices. In some embodiments the system 604 includes a second illumination device/light projector (ID/LP2) 609 in addition to the first illumination device 608. The individual illumination devices 608, 609 are each positioned in some embodiments adjacent to one of the multiple cameras 614, 616. Thus, in some embodiments each camera 614, 616, 674, 676 is paired with a physically adjacent light projection device 608. In some embodiments the light projection devices 608 includes multiple light emitting elements 603, 605 as shown in FIG. 8.

Camera C1 614 includes lens 615 while camera C2 616 includes lens 617. Camera C3 674 includes lens 675 while camera C4 676 includes lens 677. Cameras C3 674 and/or C4 676 can capture images of an illuminated area and/or object illuminated by illumination device 608 in parallel or asynchronously with the image capture performed by cameras C1 614, C2 616.

In one embodiment, camera C1 614 correspond to the first camera 206 of the camera array 904 shown in FIG. 9, while camera C2 617 correspond to camera C2 208, camera C3 674 corresponds to camera C3 210 and camera C4 676 corresponds to camera C4 912, with the cameras having the spacing as shown in FIG. 9

The light projector 608 is shown coupled to the camera array 612 by connection 610. The connection 610 can be a wired or wireless connection and is optional. The connection 610 is used in some embodiments to synchronize the light projector display frame rate with the image capture rate of the cameras C1 614 and C2 616. While four cameras are shown, more cameras may be used and or a simpler array with only three cameras C1, C2 and C3 may be used.

While the illumination device 608 and cameras C1 614, C2 616, C3 674, C4 676 are facing in the same general direction, the illumination device 608 directs light 613 in a direction intended to minimize the chance of direct reflections being returned into the cameras C1 614, C2 616, C3 674, C4, 676.

FIG. 7 is more detailed drawing 700 of the robotic apparatus/vehicle 604 shown in FIG. 6. The apparatus 604 includes a controller 702, e.g., a processor coupled to a memory 704 and the illumination/camera system 611 of FIG. 6. The processor controls the robotic device 604 to implement the method of FIG. 3.

The apparatus 604, e.g., robotic device/vehicle, supports illumination of a scene area and image capture using multiple cameras arranged in an array where camera pairs have different baselines and may share a common reference camera, e.g., camera C1. The apparatus 604 performs image processing in accordance with the invention to identify matching portions of images and to produce depth information, e.g., depth maps. The processor also performs vehicle control vehicle operations based on the depth information obtained from the image processing. While in some embodiments the apparatus 604 performs image processing and depth determination using online processor 702, in other embodiments captured images are communicated, e.g., wirelessly, to a web or cloud based system for processing and depth determination operations with in some cases depth information being returned to the apparatus 604 and used by the processor 702 for device control. Depth maps and disparity information sets generated in accordance with the invention are stored in memory 704.

FIG. 8 is another drawing 800 of the exemplary apparatus 604, e.g., robotic device or vehicle which supports illumination and image capture for depth determination purposes with still more details shown. Exemplary apparatus 604 includes a plurality of cameras, camera 1 (C1) 614, camera 2 (C2) 616 which are part of a camera array. The cameras capture images of the scene area illuminated by illumination device 608 in accordance with the invention. Exemplary vehicle 604 further includes controller 702, e.g., a processor, configured to control illumination and camera operation. The controller 702 is configured to identify matching portions of images to produce depth information in accordance with the invention, generate a depth map, and/or control vehicle operation. Memory 704 stores illumination pattern information 1053. Controller 702 is coupled to each of the cameras (C1 614, C2 616, C3 674, C4 676). Controller 702 controls the illumination device 608 to illuminate a scene area, e.g., by sequentially displaying image patterns in accordance with the information stored in illumination pattern information 1053, while cameras C1 614, C2 616 are controlled to capture images of the illuminated scene area.

Controller 702 receives images captured by each of the cameras (C1 614, C2 616, C3 674 and C4 676) In some embodiments controller 702 identifies matching portions of images corresponding to the same frame time, e.g., captured from different cameras at the same time, and uses the information about which portions match to determine depth to objects in the scene area in accordance with the method described with regard to FIG. 3. Thus, in some embodiments controller 702 uses matching portions of images to produce depth information and generate a depth map which is then used for device control or for display.

In other embodiments controller 702 causes captured images to be communicated, e.g., wirelessly via wireless communications interface 1005, to a cloud or network based image processing system. The cloud or network based image processing system processes the communicated images, e.g., in the manner described with regard to FIG. 3, and returns a depth map to the apparatus 604 to be used for device control.

In some embodiments, controller 702 controls a vehicle control operation, e.g., one of a direction, braking, or speed control operation, to be performed in response to a generated depth map. In various embodiments, controller 702 uses the depth map information to perform collision avoidance operations and/or perform autopilot operations.

Exemplary apparatus 604 shown in FIG. 8 will now be discussed further. Apparatus 604 includes the processor 702, e.g., a CPU acting as a controller, e.g., illumination device controller, a camera/synchronization controller and/or vehicle operation controller, an input device 1016, e.g., a keypad, an output device 1018, e.g., a display, an assembly of hardware components 1010, e.g., an assembly of circuits, memory 704, the plurality of cameras (camera 1 (C1) 614, camera 2 (C2) 616, camera 3 (C3) 674, camera C4 (C4) 676), speed control circuitry 1034, braking control circuitry 1030, steering control circuitry 1032, an autopilot system 1037, and a collision avoidance system 1039 coupled together via a bus 1009 over which the various components may interchange data and information. In some embodiments, the autopilot system 1037 and/or the collision avoidance system 1039 are coupled together and/or to the speed control circuitry 1034, braking control circuitry 1030 and/or steering control circuitry. Apparatus 604 further includes engine/fuel/transmission components 1036, e.g., a motor, internal combustion and/or electric, computer controlled fuel injection system, electronically controlled transmission, etc., which is coupled to speed control circuitry 1034. Apparatus 604 further includes brake system components 1038, e.g., ABS system, brake sensors, wheel motion sensors, wheel position sensors, actuators, hydraulic components, electronically controlled brakes, etc., coupled to braking control circuitry 1030. Apparatus 604 further includes steering system components 1040, e.g., rack and pinion unit, steering input controls and steering drive components including motors, etc., coupled to steering control circuitry 1032. In some embodiments, the speed control circuitry 1034, braking control circuitry 1030 and/or steering control circuitry 1032 is part of an autonomous or semi-autonomous driving control system and/or an assisted driving control system. A wireless interface 1005, e.g., including a wireless radio transmitter and receiver, which allows the controller 702 to communicate captured images to a cloud based image processing system and to receive depth map information generated from captured images back from the cloud based system.

Memory 704 includes an assembly of software components 1050, e.g., an assembly of software routines or software modules, and data/information 1052. Memory 704 includes stored information (SI) 1061 which can include image data as well as other information. SI 1061 includes, in some embodiments, one more or all of: depth information generated from captured images, generated models, e.g., 2D and/or 3D object recognition models, non-patterned images of an object and/or area, and/or illumination patterned images of the object and/or area.

Assembly of software components 1050 includes illumination control routine (ICR) 1051, an image processing and/or combining routine 1057, an image portion matching routine 1070 and a depth map routine 1072. ICR 1051 when executed by controller 702 controls the apparatus 604 to display a sequence of images, indicated in stored illumination pattern information 1053 by causing the illumination device 608 to output, e.g., display the image patterns in sequence. Image processing (IP) and/or combining routine 1057 in some embodiments combines images showing a pattern captured by one or more cameras to produce an image in which the pattern is not visible. Routine 1057 in some embodiments also performs processing and/or stores information associating depth data, e.g., a depth map, generated from stereoscopic images captured by cameras. Data/information 1052 includes captured images (captured image 1 1054, . . . , captured image Z 1056), generated, e.g. non-pattern images 1059, generated depth map information 1058 which can include a generated depth map and/or sets of disparity information generated in accordance with one or more of the steps of the method of FIG. 3, e.g., where the depth maps/disparity information 1058 are generated from captured images, and a generated vehicle control command 1060, e.g., to be sent to speed control circuitry 1034, braking control circuitry 1030, steering control circuitry 1032, autopilot system 1037 and/or collision avoidance system 1039, e.g. in response to a detected change and/or problem, detected by analyzing the generated depth map, e.g., a stopped or disabled truck suddenly is detected in front of the vehicle resulting in a control command for avoidance.

Apparatus 604 can be any of a wide range of devices including any of: a robotic device, an product inspection device, an image capture device, a 3D model generation device, a land vehicle, e.g., a car, truck, motorcycle, bicycle, train, unmanned terrestrial vehicle, etc., a sea or water vehicle, e.g., boat, ship, unmanned water vehicle, etc., amphibious vehicle, air vehicle, e.g., airplane, helicopter, glider, unmanned aerial vehicle, etc.

NUMBERED LIST OF EXEMPLARY METHOD EMBODIMENTS

Method Embodiment 1. A method of determining depth, the method comprising: capturing (308) a first image using a first camera (e.g., a reference camera C1 206 or C1 1004 depending on the embodiment) in a camara array (204 or 904 or 1001) including said first camera (206 or 1004), a second camera (C2 208 or C2 1006) and a third camera (C3 210 or C3 1008), the first (206 or 1004) and second (208 or 1006) cameras being separated by a first distance (D1, e.g., 10 cm in the FIG. 2 example), the first (206 or 1004) and third (210 or 1008) cameras being separated by a second distance (D2, e.g. 100 cm in the FIG. 2 example), the second distance being at least two times the first distance (e.g., if the distance D1 between the first (206 or 1004) and second cameras (208 or 1006) is ⅓ a meter, the distance D2 between the first (206 or 1004)) and third (210 or 1008) cameras is at least ⅔ a meter, but in many cases the distance D2 is at least 9 times the distance D1, but in some cases even more, e.g., 10 times D1); capturing (310) a second image using the second camera (208 or 1006) in said camera array (204 or 904 or 1001); capturing (312) a third image using the third camera (210 or 1008) in said camera array (204 or 904 or 1001); making (319) first stereoscopic depth determinations for individual image portions (e.g., where each image portion includes one or more pixels) of said first image based on the content of said second image, said first stereoscopic distance determinations producing a first depth for each of a plurality of image portions in said first image; and making (330) second stereoscopic depth determinations for individual image portions of said first image based on the content of said third image, said step of making (330) the second stereoscopic depth determinations for individual image portions of said first image including performing (332) a constrained search for a corresponding image portion in the third image corresponding to an individual image portion of the first image based on the first depth corresponding to the individual image portion of the first image.

Method Embodiment 2. The method of Method Embodiment 1,
wherein making (319, 330) first and second stereoscopic depth determinations for individual portions of the first image includes using the first image captured by the first camera (206 or 1004) as a reference image for both said first and second stereoscopic depth determinations.

Method Embodiment 3. The method of Method Embodiment 2, wherein the second distance between the first camera (206 or 1004) and third camera (210 or 1008) is at least 5 times the first distance between the first camera (206 or 1004) and second camera (208 or 1006).

Method Embodiment 4. The method of Method Embodiment 2, wherein the center to center distance from a center of the first camera (206 or 1004) in the camera array (204 or 904 or 1001) to the center of the second camera (208 or 1006) in the camera array (204 or 904 or 1001) is a first camera pair baseline, and wherein the distance from the center of the first camera (106 or 1004) to the center of the third camera (210 or 1008) in the camera array (204 or 904 or 1001) is a second camera pair baseline, said second camera pair baseline being a multiple N of at least two times the first camera pair baseline (e.g., where N is a positive value equal to or greater than 2 (e.g., 3, 4, 5, 6, 7, 8, 9, 10 or a value greater than 10 in some embodiments)).

Method Embodiment 5. The method of Method Embodiment 4, wherein the camera array (904) further includes a fourth camera (C4 912) wherein the center to center distance from a center of the first camera (206) in the camera array (904) to the center of a fourth camera (912) in the camera array (904) is a third camera pair baseline, said third camera pair baseline being a multiple Z of at least two times the second camera pair baseline (e.g., where Z is a positive value equal to or greater than 2 (e.g., 3, 4, 5, 6, 7, 8, 9, 10 or a value greater than 10 in some embodiments)).

Method Embodiment 6. The method of Method Embodiment 5, where N and Z are the same value.

Method Embodiment 6B. The method of Method Embodiment 1, wherein making (319, 330) first stereoscopic depth determinations and second stereoscopic depth determinations includes using the first camera (206 or 1004) as a reference camera when making (319, 330) the first and second stereoscopic depth determinations.

Method Embodiment 7. The method of Method Embodiment 5, further comprising: making (340) third stereoscopic depth determinations for individual image portions of said first image based on the content of a fourth image captured by the fourth camera (912), said step of making (340) the third stereoscopic depth determinations for individual image portions of said first image including performing (342) a constrained search for a corresponding image portion in the fourth image corresponding to an individual image portion of the first image based on a second depth determined when making said second depth determinations.

Method Embodiment 8. The method of Method Embodiment 2, wherein performing (332) a constrained search includes limiting an area of the third image which is searched for a match to a first portion of the first image based on a disparity corresponding to the first portion of the first image that was determined during one of the first stereoscopic depth determinations (e.g., with the disparity determined from the first stereoscopic depth determination corresponding to the first image portion being scaled (e.g., multiplied by N) to take into consideration how much longer the second camera pair baseline is compared to the first camera pair baseline).

Method Embodiment 9. The method of Method Embodiment 1, further comprising: generating (349) a depth map from the second stereoscopic depths determinations (e.g., generate depth values indicating a physical distance from the reference camera for each individual pixel of a depth map being generated with the generated depth value being large for small determined disparities (e.g., actual depth value is in some cases inversely proportional to the determined disparity for an image portion) since at long distances the shift in position from the reference image to the other image will be small the longer the distance the smaller the disparity for an image portion determined by the matching process).

Method Embodiment 10. The method of Method Embodiment 9, wherein generating (349) a depth map from the second stereoscopic depth determinations includes: including (352) in said depth map depth values, based on first stereoscopic depth determinations, for individual image portions for which a match between an image portion of the first image and an image portion of said third image was not determined due to a failure to find an image portion in said third image corresponding to an image portion of the first image.

Method Embodiment 11. The method of Method Embodiment 10, wherein the majority of depth values included in the depth map are generated based on disparity values generated from second depth determinations.

Method Embodiment 12. The method of Method Embodiment 11, wherein a minority of depth values included in the depth map are generated from the first depth determination, said minority of depth values corresponding to surfaces (e.g., surfaces of objects) which are not visible to both the first and third cameras (and thus correspond to occluded surfaces with respect to the spaced cameras used to capture the images used to generate the second depth determinations).

Method Embodiment 13. The method of Method Embodiment 2, wherein the camera array (204 or 904 or 1001) is an array of at least 3 cameras, said first (206 or 1004), second (208 or 1006) and third (210 or 2008) cameras being part of said camera array (204 or 904 or 1001); wherein the first (206 or 1004) and second cameras (208 or 1006) are positioned along a first line; and wherein the first (206 or 1004) and third (208 or 1006) cameras are positioned along a second line.

Method Embodiment 13A. The method of Method Embodiment 13, wherein at least 75 percent of depth values in the depth map of a region of interest are generated based on second depth determinations and are of higher accuracy than depth values based on first depth determinations.

Method Embodiment 13B. The method of Method Embodiment 2, wherein the camera array (204 or 904) is an array of at least 3 cameras (206, 208, 210) positioned along a straight line.

Method Embodiment 14. The method of Method Embodiment 13, wherein the first and second lines are at a non-zero degree angle with respect to each other.

Method Embodiment 15. The method of Method Embodiment 14, wherein the first and second lines are at 90 degrees to each other.

Method Embodiment 16. The method of Method Embodiment 2, wherein the first camera (206 or 1004) and the second camera (208 or 1006) are separated by a camera center to center distance of 0.2 meters or less, and wherein the first camera (206 or 1004) and the third camera (210 or 1008) are separated by a camera center to center distance of at least 0.8 meters.

Method Embodiment 17A. The method of Method Embodiment 1, wherein the first (206 or 1004), second (208 or 1006) and third (210 or 1008) cameras are mounted in a plane.

Method Embodiment 17B. The method of Method Embodiment 17A, wherein the first (206 or 1004) and second (208 or 1006) cameras are mounted along a first line.

Method Embodiment 17C. The method of Method Embodiment 17B, wherein the first (206) and third (210) cameras are also mounted along said first line.

Method Embodiment 17D. The method of Method Embodiment 17B, wherein the first (1004) and third (1006) cameras are mounted along a second line which is perpendicular to the first line.

Method Embodiment 17E. The method of Method Embodiment 17B, wherein the camera array (204) includes three cameras, said three cameras being the total number of cameras in the camera array.

Method Embodiment 17F. The method of Method Embodiment 1 wherein the camera array (204 or 904) includes three cameras (206, 208, 210) arranged in a straight line.

Method Embodiment 17G. The method of Method Embodiment 1, wherein the camera array (204, or 1001) is an array including only 3 cameras ((206, 208, 210) or (1004, 1006, 1008)).

Method Embodiment 17H. The method of Method Embodiment 1 wherein said first (206 or 1004), second (208 or 1006) and third (210 or 1008) cameras are operated to capture said first, second, and third images in parallel (e.g., the first, second and third images are captured at the same time, e.g., with the same exposure duration and same exposure start time in some embodiments).

Method Embodiment 17I. The method of Method Embodiment 1, wherein at least some of said first (206 or 1004), second (208 or 1006) and third (210 or 1008) cameras are operated to capture images at different times, said first, second an third cameras remaining stationary during a time interval in which said first (206 or 1004), second (206 or 1004) and third (210 or 1008) cameras are captured, said first, second, and third images at different times (e.g., image capture can be at different times when there is no motion in the scene or the camera array (204 or 904 or 1001)).

NUMBERED LIST OF EXEMPLARY SYSTEM EMBODIMENTS

System Embodiment 1. A system for determining depth, the system comprising: a camara array (204 or 904 or 1001) including a first camera (206 or 1004), a second camera (C2 208 or C2 1006) and a third camera (C3 210 or C3 1008), the first (206 or 1004) and second (208 or 1006) cameras being separated by a first distance (D1, e.g., 10 cm in the FIG. 2 example), the first (206 or 1004) and third (210 or 1008) cameras being separated by a second distance (D2, e.g. 100 cm in the FIG. 2 example), the second distance being at least two times the first distance (e.g., if the distance D1 between the first (206 or 1004) and second cameras (208 or 1006) is ⅓ a meter, the distance D2 between the first (206 or 1004) and third (210 or 1008) cameras is at least ⅔ a meter, but in many cases the distance D2 is at least 9 times the distance D1, but in some cases even more, e.g., 10 times D1); and a processor (702) configured to: control the first camera (e.g., a reference camera C1 206 or C1 1004 depending on the embodiment) to capture (308) a first image; control the second camera (208 or 1006) to capture a second image; control the third camera (210 or 1008) to capture a third image; make (319) first stereoscopic depth determinations for individual image portions (e.g., where each image portion includes one or more pixels) of said first image based on the content of said second image, said first stereoscopic distance determinations producing a first depth for each of a plurality of image portions in said first image; and make (330) second stereoscopic depth determinations for individual image portions of said first image based on the content of said third image, said step of making (330) the second stereoscopic depth determinations for individual image portions of said first image including performing (332) a constrained search for a corresponding image portion in the third image corresponding to an individual image portion of the first image based on the first depth corresponding to the individual image portion of the first image.

System Embodiment 2. The system of System Embodiment 1, wherein the processor (702) is configured to use the first image captured by the first camera (206 or 1004) as a reference image for both said first and second stereoscopic depth determinations.

System Embodiment 3. The system of System Embodiment 2, wherein the second distance between the first camera (206 or 1004) and third camera (210 or 1008) is at least 5 times the first distance between the first camera (206 or 1004) and second camera (208 or 1006).

System Embodiment 4. The system of System Embodiment 2, wherein the center to center distance from a center of the first camera (206 or 1004) in the camera array (204 or 904 or 1001) to the center of the second camera (208 or 1006) in the camera array (204 or 904 or 1001) is a first camera pair baseline, and wherein the distance from the center of the first camera (106 or 1004) to the center of the third camera (210 or 1008) in the camera array (204 or 904 or 1001) is a second camera pair baseline, said second camera pair baseline being a multiple N of at least two times the first camera pair baseline (e.g., where N is a positive value equal to or greater than 2 (e.g., 3, 4, 5, 6, 7, 8, 9, 10 or a value greater than 10 in some embodiments)).

System Embodiment 5. The system of System Embodiment 4, wherein the camera array (904) further includes a fourth camera (C4 912) wherein the center to center distance from a center of the first camera (206) in the camera array (904) to the center of a fourth camera (912) in the camera array (904) is a third camera pair baseline, said third camera pair baseline being a multiple Z of at least two times the second camera pair baseline (e.g., where Z is a positive value equal to or greater than 2 (e.g., 3, 4, 5, 6, 7, 8, 9, 10 or a value greater than 10 in some embodiments)).

System Embodiment 6. The system of System Embodiment 5, where N and Z are the same value.

System Embodiment 6B. The system of System Embodiment 1, wherein the processor (702) is configured to use the first camera (206 or 1004) as a reference camera when making (319, 330) the first and second stereoscopic depth determinations.

System Embodiment 7. The system of System Embodiment 5, wherein the processor (702) is further configured to: make (340) third stereoscopic depth determinations for individual image portions of said first image based on the content of a fourth image captured by the fourth camera (912), said step of making (340) the third stereoscopic depth determinations for individual image portions of said first image including performing (342) a constrained search for a corresponding image portion in the fourth image corresponding to an individual image portion of the first image based on a second depth determined when making said second depth determinations.

System Embodiment 8. The system of System Embodiment 2, wherein as part of being configured to perform (332) a constrained search, the processor (702) is configured to limit an area of the third image which is searched for a match to a first portion of the first image based on a disparity corresponding to the first portion of the first image that was determined during one of the first stereoscopic depth determinations (e.g., with the disparity determined from the first stereoscopic depth determination corresponding to the first image portion being scaled (e.g., multiplied by N) to take into consideration how much longer the second camera pair baseline is compared to the first camera pair baseline).

System Embodiment 9. The system of System Embodiment 1, wherein the processor is further configured to: generate (349) a depth map from the second stereoscopic depths determinations (e.g., generate depth values indicating a physical distance from the reference camera for each individual pixel of a depth map being generated with the generated depth value being large for small determined disparities (e.g., actual depth value is in some cases inversely proportional to the determined disparity for an image portion) since at long distances the shift in position from the reference image to the other image will be small the longer the distance the smaller the disparity for an image portion determined by the matching process).

System Embodiment 10. The system of System Embodiment 9, wherein as part of being configured to generate (349) a depth map from the second stereoscopic depth determinations, the processor (702) is configured to: include (352) in said depth map depth values, based on first stereoscopic depth determinations, for individual image portions for which a match between an image portion of the first image and an image portion of said third image was not determined due to a failure to find an image portion in said third image corresponding to an image portion of the first image.

System Embodiment 11. The system of System Embodiment 10, wherein the majority of depth values included in the depth map are generated based on disparity values generated from second depth determinations.

System Embodiment 12. The system of System Embodiment 11, wherein a minority of depth values included in the depth map are generated from the first depth determination, said minority of depth values corresponding to surfaces (e.g., surfaces of objects) which are not visible to both the first and third cameras (and thus correspond to occluded surfaces with respect to the spaced cameras used to capture the images used to generate the second depth determinations).

System Embodiment 13. The system of System Embodiment 2, wherein the camera array (204 or 904 or 1001) is an array of at least 3 cameras, said first (206 or 1004), second (208 or 1006) and third (210 or 2008) cameras being part of said camera array (204 or 904 or 1001); wherein the first (206 or 1004) and second cameras (208 or 1006) are positioned along a first line; and wherein the first (206 or 1004) and third (208 or 1006) cameras are positioned along a second line.

System Embodiment 13A. The system of System Embodiment 13, wherein at least 75 percent of depth values in the depth map of a region of interest are generated based on second depth determinations and are of higher accuracy than depth values based on first depth determinations.

System Embodiment 13B. The system of System Embodiment 2, wherein the camera array (204 or 904) is an array of at least 3 cameras (206, 208, 210) positioned along a straight line.

System Embodiment 14. The system of System Embodiment 13, wherein the first and second lines are at a non-zero degree angle with respect to each other.

System Embodiment 15. The system of System Embodiment 14, wherein the first and second lines are at 90 degrees to each other.

System Embodiment 16. The system of System Embodiment 2, wherein the first camera (206 or 1004) and the second camera (208 or 1006) are separated by a camera center to center distance of 0.2 meters or less, and wherein the first camera (206 or 1004) and the third camera (210 or 1008) are separated by a camera center to center distance of at least 0.8 meters.

System Embodiment 17A. The system of System Embodiment 1, wherein the first (206 or 1004), second (208 or 1006) and third (210 or 1008) cameras are mounted in a plane.

System Embodiment 17B. The system of System Embodiment 17A, wherein the first (206 or 1004) and second (208 or 1006) cameras are mounted along a first line.

System Embodiment 17C. The system of System Embodiment 17B, wherein the first (206) and third (210) cameras are also mounted along said first line.

System Embodiment 17D. The system of System Embodiment 17B, wherein the first (1004) and third (1006) cameras are mounted along a second line which is perpendicular to the first line.

System Embodiment 17E. The system of System Embodiment 17B, wherein the camera array (204) includes three cameras, said three cameras being the total number of cameras in the camera array.

System Embodiment 17F. The system of System Embodiment 1 wherein the camera array (204 or 904) includes three cameras (206, 208, 210) arranged in a straight line.

System Embodiment 17G. The system of System Embodiment 1, wherein the camera array (204, or 1001) is an array including only 3 cameras ((206, 208, 210) or (1004, 1006, 1008)).

System Embodiment 17H. The system of System Embodiment 1 wherein said first (206 or 1004), second (208 or 1006) and third (210 or 1008) cameras are operated to capture said first, second, and third images in parallel (e.g., the first, second and third images are captured at the same time, e.g., with the same exposure duration and same exposure start time in some embodiments).

System Embodiment 17I. The system of System Embodiment 1, wherein at least some of said first (206 or 1004), second (208 or 1006) and third (210 or 1008) cameras are operated to capture images at different times, said first, second an third cameras remaining stationary during a time interval in which said first (206 or 1004), second (206 or 1004) and third (210 or 1008) cameras are captured, said first, second, and third images at different times (e.g., image capture can be at different times when there is no motion in the scene or the camera array (204 or 904 or 1001)).

Some aspects and/or features are directed to a non-transitory computer readable medium embodying a set of software instructions, e.g., computer executable instructions, for controlling a computer or other device, e.g., a vehicle or robotic device, to operate in accordance with the above discussed methods.

The techniques of various embodiments may be implemented using software, hardware and/or a combination of software and hardware. Various embodiments are directed to a control apparatus, e.g., controller or control system, which can be implemented using a microprocessor including a CPU, memory and one or more stored instructions for controlling a device or apparatus to implement one or more of the above described steps. Various embodiments are also directed to methods, e.g., a method of controlling a vehicle or drone or remote control station and/or performing one or more of the other operations described in the present application. Various embodiments are also directed to a non-transitory machine, e.g., computer, readable medium, e.g., ROM, RAM, CDs, hard discs, etc., which include machine readable instructions for controlling a machine to implement one or more steps of a method.

As discussed above, various features of the present invention are implemented using modules and/or components. Such modules and/or components may, and in some embodiments are, implemented as software modules and/or software components. In other embodiments the modules and/or components are implemented in hardware. In still other embodiments the modules and/or components are implemented using a combination of software and hardware. In some embodiments the modules and/or components are implemented as individual circuits with each module and/or component being implemented as a circuit for performing the function to which the module and/or component corresponds. A wide variety of embodiments are contemplated including some embodiments where different modules and/or components are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

The techniques of the present invention may be implemented using software, hardware and/or a combination of software and hardware. The present invention is directed to apparatus, e.g., a vehicle which implements one or more of the steps of the present invention. The present invention is also directed to machine readable medium, e.g., ROM, RAM, CDs, hard discs, etc., which include machine readable instructions for controlling a machine to implement one or more steps in accordance with the present invention.

Numerous additional variations on the methods and apparatus of the various embodiments described above will be apparent to those skilled in the art in view of the above description. Such variations are to be considered within the scope.

What is claimed:

1. A method of determining depth, the method comprising:
    capturing a first image using a first camera in a camara array including said first camera, a second camera and a third camera, the first and second cameras being separated by a first distance, the first and third cameras being separated by a second distance, the second distance being at least two times the first distance;
    capturing a second image using the second camera in said camera array;
    capturing a third image using the third camera in said camera array;
    making first stereoscopic depth determinations for individual image portions of said first image based on the content of said second image, said first stereoscopic depth determinations producing a first depth for each of a plurality of image portions in said first image; and
    making second stereoscopic depth determinations for individual image portions of said first image based on the content of said third image, said step of making the second stereoscopic depth determinations for individual image portions of said first image including performing a constrained search for a corresponding image portion in the third image corresponding to an individual image portion of the first image based on the first depth corresponding to the individual image portion of the first image.

2. The method of claim 1,
    wherein making first and second stereoscopic depth determinations for individual image portions of the first image includes using the first image captured by the first camera as a reference image for both said first and second stereoscopic depth determinations.

3. The method of claim 2,
    wherein the second distance between the first camera and third camera is at least 5 times the first distance between the first camera and second camera.

4. The method of claim 2, wherein a center to center distance from a center of the first camera in the camera array to the center of the second camera in the camera array is a first camera pair baseline, and wherein the distance from the center of the first camera to the center of the third camera in the camera array is a second camera pair baseline, said second camera pair baseline being a multiple N of at least two times the first camera pair baseline.

5. The method of claim 4, wherein the camera array further includes a fourth camera, and wherein the center to center distance from a center of the first camera in the camera array to the center of a fourth camera in the camera array is a third camera pair baseline, said third camera pair baseline being a multiple Z of at least two times the second camera pair baseline.

6. The method of claim 5, where N and Z are the same value.

7. The method of claim 5, further comprising:
    making third stereoscopic depth determinations for individual image portions of said first image based on the content of a fourth image captured by the fourth camera, said step of making the third stereoscopic depth determinations for individual image portions of said first image including performing a constrained search for a corresponding image portion in the fourth image corresponding to an individual image portion of the first image based on a second depth determined when making said second depth determinations.

8. The method of claim 2, wherein performing a constrained search includes limiting an area of the third image which is searched for a match to a first portion of the first image based on a disparity corresponding to the first portion of the first image that was determined during one of the first stereoscopic depth determinations.

9. The method of claim 2, wherein the camera array is an array of at least 3 cameras, said first, second and third cameras being part of said camera array; wherein the first and second cameras are positioned along a first line; and
    wherein the first and third cameras are positioned along a second line.

10. The method of claim 9, wherein the first and second lines are at a non-zero degree angle with respect to each other.

11. The method of claim 10, wherein the first and second lines are at 90 degrees to each other.

12. The method of claim 1, further comprising:
    generating a depth map from the second stereoscopic depths determinations.

13. The method of claim 12, wherein generating a depth map from the second stereoscopic depth determinations includes:
    including, in said depth map, depth values, based on first stereoscopic depth determinations, for individual image portions for which a match between an image portion of the first image and an image portion of said third image was not determined due to a failure to find an image portion in said third image corresponding to an image portion of the first image.

14. The method of claim 13, wherein the majority of depth values included in the depth map are generated based on disparity values generated from second depth determinations.

15. The method of claim 14, wherein a minority of depth values included in the depth map are generated from the first depth determination, said minority of depth values corresponding to surfaces which are not visible to both the first and third cameras.

16. A system for determining depth, the system comprising:
   a camara array including a first camera, a second camera and a third camera, the first and second cameras being separated by a first distance, the first and third cameras being separated by a second distance, the second distance being at least two times the first distance; and
   a processor configured to:
   control the first camera to capture a first image;
   control the second camera to capture a second image;
   control the third camera to capture a third image;
   make first stereoscopic depth determinations for individual image portions of said first image based on the content of said second image, said first stereoscopic depth determinations producing a first depth for each of a plurality of image portions in said first image; and
   make second stereoscopic depth determinations for individual image portions of said first image based on the content of said third image, said step of making the second stereoscopic depth determinations for individual image portions of said first image including performing a constrained search for a corresponding image portion in the third image corresponding to an individual image portion of the first image based on the first depth corresponding to the individual image portion of the first image.

17. The system of claim 16, wherein the processor is configured to use the first image captured by the first camera as a reference image for both said first and second stereoscopic depth determinations.

18. The system of claim 17,
   wherein the second distance between the first camera and third camera is at least 5 times the first distance between the first camera and second camera.

19. The system of claim 17, wherein the center to center distance from a center of the first camera in the camera array to the center of the second camera in the camera array is a first camera pair baseline, and wherein the distance from the center of the first camera to the center of the third camera in the camera array is a second camera pair baseline, said second camera pair baseline being a multiple N of at least two times the first camera pair baseline.

20. The system of claim 19, wherein the camera array further includes a fourth camera wherein the center to center distance from a center of the first camera in the camera array to the center of a fourth camera in the camera array is a third camera pair baseline, said third camera pair baseline being a multiple Z of at least two times the second camera pair baseline.

21. The system of claim 20, where N and Z are the same value.

22. The system of claim 20, wherein the processor is further configured to:

make third stereoscopic depth determinations for individual image portions of said first image based on the content of a fourth image captured by the fourth camera, said step of making the third stereoscopic depth determinations for individual image portions of said first image including performing a constrained search for a corresponding image portion in the fourth image corresponding to an individual image portion of the first image based on a second depth determined when making said second depth determinations.

23. The system of claim 22, wherein the majority of depth values included in the depth map are generated based on disparity values generated from second depth determinations.

24. The system of claim 23, wherein a minority of depth values included in the depth map are generated from the first depth determination, said minority of depth values corresponding to surfaces which are not visible to both the first and third cameras.

25. The system of claim 23, wherein the first and second lines are at a non-zero degree angle with respect to each other.

26. The system of claim 17, wherein as part of being configured to perform a constrained search, the processor is configured to limit an area of the third image which is searched for a match to a first portion of the first image based on a disparity corresponding to the first portion of the first image that was determined during one of the first stereoscopic depth determinations.

27. The system of claim 17, wherein the camera array is an array of at least 3 cameras, said first, second and third cameras being part of said camera array;
   wherein the first and second cameras are positioned along a first line; and
   wherein the first and third cameras are positioned along a second line.

28. The system of claim 16, wherein the processor is further configured to:
   generate a depth map from the second stereoscopic depths determinations.

29. The system of claim 28, wherein as part of being configured to generate a depth map from the second stereoscopic depth determinations, the processor is configured to:
   include in said depth map depth values, based on first stereoscopic depth determinations, for individual image portions for which a match between an image portion of the first image and an image portion of said third image was not determined due to a failure to find an image portion in said third image corresponding to an image portion of the first image.

30. A non-transitory computer readable medium having processor executable instructions, which when executed by a processor of a device that includes a camara array including a first camera, a second camera and a third camera, the first and second cameras being separated by a first distance, the first and third cameras being separated by a second distance, the second distance being at least two times the first distance, cause the processor to:
   control the first camera to capture a first image;
   control the second camera to capture a second image;
   control the third camera to capture a third image;
   make first stereoscopic depth determinations for individual image portions of said first image based on the content of said second image, said first stereoscopic depth determinations producing a first depth for each of a plurality of image portions in said first image; and make second stereoscopic depth determinations for individual image portions of said first image based on the content of said third image, said step of making the second stereoscopic depth determinations for individual image portions of said first image including performing a constrained search for a corresponding image portion in the third image corresponding to an individual image portion of the first image based on the first depth corresponding to the individual image portion of the first image.

* * * * *